US011425864B2

(12) United States Patent
Naeyaert et al.

(10) Patent No.: US 11,425,864 B2
(45) Date of Patent: Aug. 30, 2022

(54) KNOTTER SYSTEM FOR A BALER

(71) Applicant: CNH Industrial America LLC, New Holland, PA (US)

(72) Inventors: Karel Naeyaert, Loppem (BE); Fernando Alvarez Guerra, La Luisiana (ES)

(73) Assignee: CNH Industrial America LLC, New Holland, PA (US)

( * ) Notice: Subject to any disclaimer, the term of this patent is extended or adjusted under 35 U.S.C. 154(b) by 479 days.

(21) Appl. No.: 16/610,367

(22) PCT Filed: Apr. 27, 2018

(86) PCT No.: PCT/EP2018/060960
§ 371 (c)(1),
(2) Date: Nov. 1, 2019

(87) PCT Pub. No.: WO2018/202594
PCT Pub. Date: Nov. 8, 2018

(65) Prior Publication Data
US 2020/0137960 A1      May 7, 2020

(30) Foreign Application Priority Data

May 2, 2017   (BE) ................................. 2017/5308

(51) Int. Cl.
*A01F 15/04*      (2006.01)
*A01F 15/14*      (2006.01)

(52) U.S. Cl.
CPC ............ *A01F 15/145* (2013.01); *A01F 15/04* (2013.01)

(58) Field of Classification Search
CPC ........ A01F 15/04; A01F 15/14; A01F 15/145; B65H 69/04
(Continued)

(56) References Cited

U.S. PATENT DOCUMENTS 7,752,959 B1 *   7/2010  Roth ...................... A01D 69/12
                                                    184/6
9,736,989 B2 *   8/2017  Verhaeghe .............. A01F 15/14
(Continued)

FOREIGN PATENT DOCUMENTS

DE       20316967 U1    3/2005
WO       2015/014616 A1 2/2015

OTHER PUBLICATIONS

International Search Report and Written Opinion for PCT Application No. PCT/EP2018/060960 dated Jul. 2, 2018 (11 pages).

*Primary Examiner* — Jimmy T Nguyen
(74) *Attorney, Agent, or Firm* — Peter Zacharias; Patrick Sheldrake

(57) ABSTRACT

A knotter system for a baler, including a needle; a tucker arm; a billhook; and a driver adapted to make the billhook perform at least a first full rotation during the first knot forming cycle and a second full rotation during the second knot forming cycle. The driver comprises a pinion and at least a first and second gear stretch provided along a circumference of a disc. The disc is provided with a recess downstream of at least one of the first gear stretch and the second gear stretch. An obstacle is arranged for engaging the pinion when moving in the recess. The recess and obstacle are configured to rotate the pinion over a determined angle and back to move the upper lip of the billhook away from the lower lip and back after at least one of the first full rotation and the second full rotation.

19 Claims, 19 Drawing Sheets

(58) Field of Classification Search
USPC .......................................... 100/33 R; 289/2
See application file for complete search history.

(56) References Cited

U.S. PATENT DOCUMENTS

2015/0097370 A1* 4/2015 Schumacher ......... A01F 15/145
  289/1.5
2015/0272011 A1 10/2015 Demon

* cited by examiner

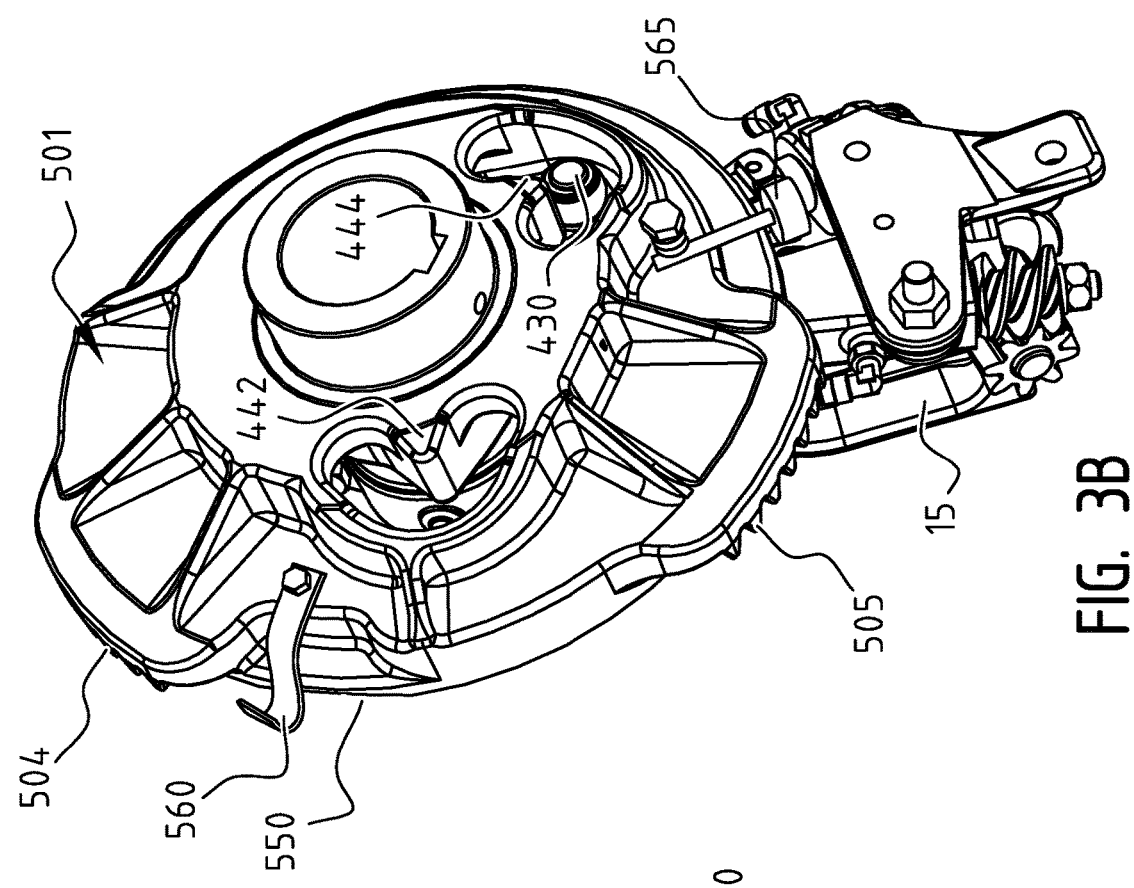
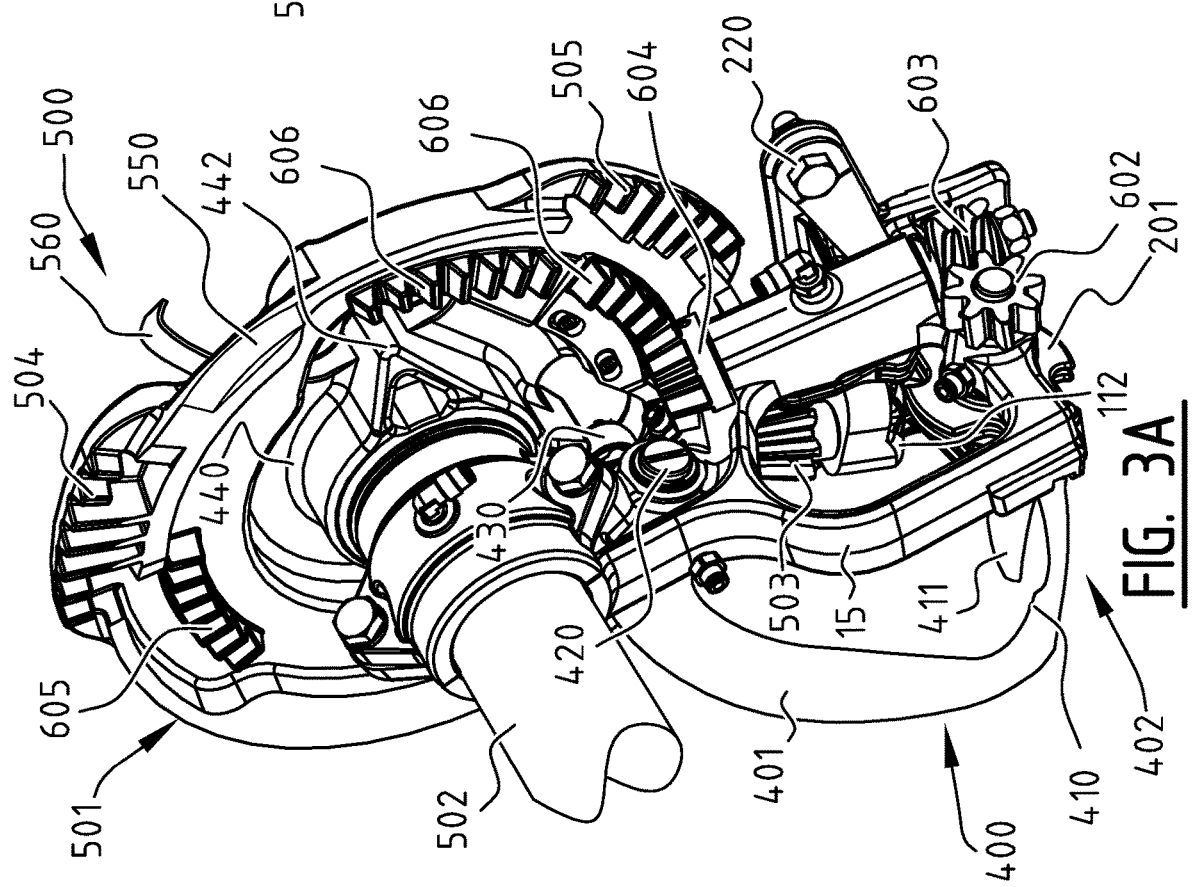

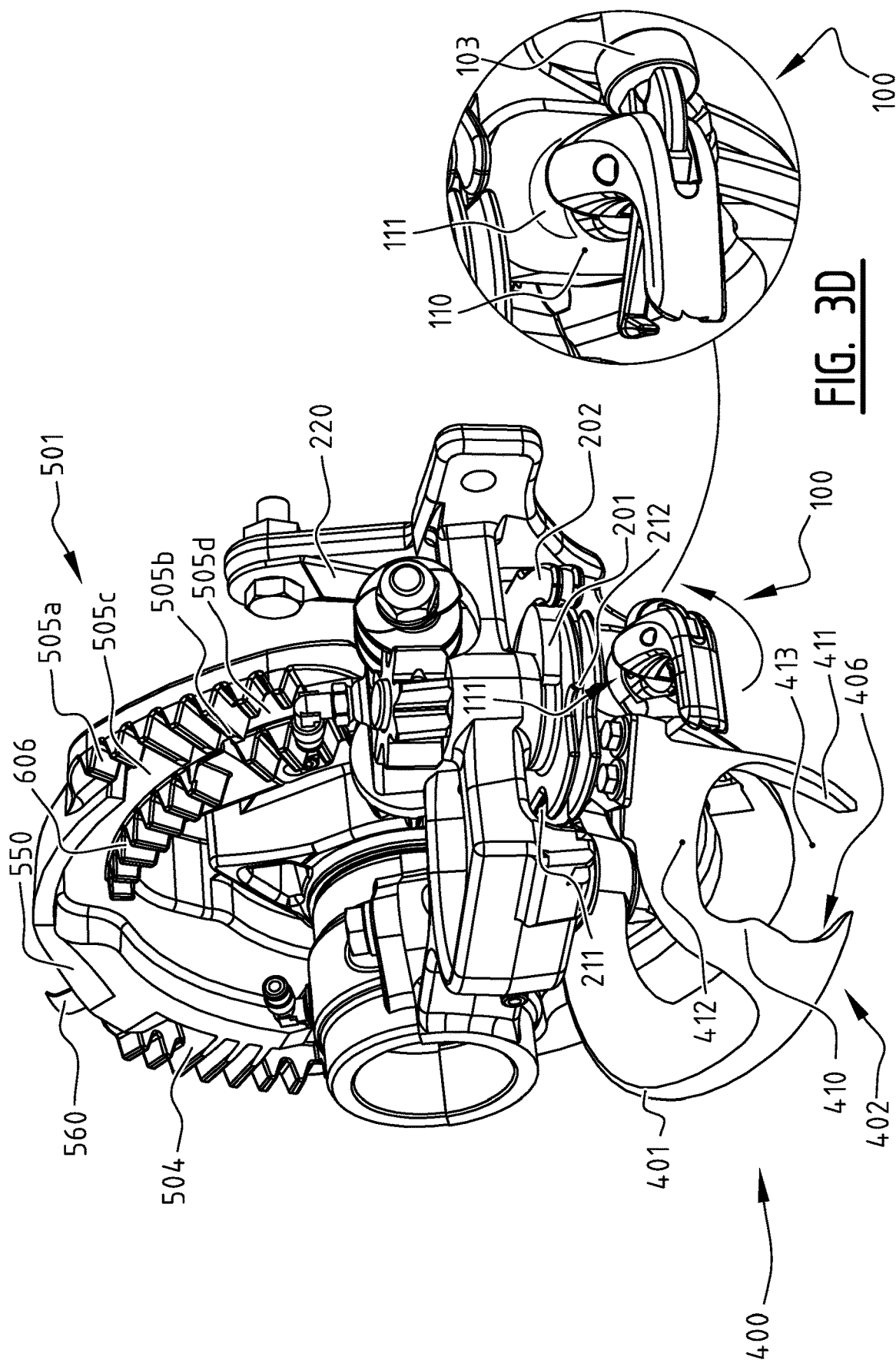

KNOTTER SYSTEM FOR A BALER

FIELD OF THE INVENTION

The present invention relates to a knotter system, and in particular to a knotter system for a baler for forming two consecutive knots during a single knotter cycle, said knotter cycle comprising at least a first knot forming cycle and a second knot forming cycle.

BACKGROUND OF THE INVENTION

Rectangular bales are able to maintain their shape by means of a series of parallel extending twine loops, provided lengthwise around the bales. Known balers typically use automatic knotters by which two knots are made on every loop for binding a bale. An example of such a knotter system for a baler is disclosed in U.S. 2006/0012176 in the name of the Applicant, the disclosure of which is included herein by reference. The knotter system disclosed in U.S. 2006/0012176 has the advantage that two consecutive knots can be formed during one operation cycle, without the formation of twine tails.

Similar improved knotter systems are disclosed in patent applications in the name of the Applicant with publications numbers WO2015/014616, WO2014/060245 and U.S. 2015/0272011, the disclosure of which is included herein by reference.

In prior art knotter systems, it is typically desirable that the second knot is a loop knot. Also, it may be desirable that the first knot is a loop knot. To achieve good loop knots the settings are very critical. Also the twine type and quality is critical to achieve a good result.

SUMMARY OF THE INVENTION

The object of embodiments of the present invention is to further improve the knotter system of U.S. 2006/0012176 and WO2014/060245, and more in particular to improve the forming of the first and/or second knot such that a loop knot can be achieved in a less critical way. More in particular, an object of embodiments of the invention is to obtain also a good first and/or second loop knot with non-optimal settings and/or with twine having a reduced quality.

According to a first aspect there is provided a knotter system for performing a knotter cycle of a baler, comprising at least a first knot forming cycle and a second knot forming cycle. The knotter system comprises: a needle configured for delivering a needle twine; a tucker arm configured for delivering a tucker twine; a billhook assembly; and a drive means. The billhook assembly comprises a billhook with a lower lip and an upper lip mounted pivotally with respect to lower lip. The billhook is mounted rotatably around a rotation axis, preferably an inclined rotation axis.

The drive means is adapted to make the billhook perform at least a first full rotation around its rotation axis during the first knot forming cycle and a second full rotation around its rotation axis during the second knot forming cycle. The drive means comprise a pinion and at least a first and second gear stretch provided along the circumference of a disc. The pinion is adapted to cooperate with the first and second gear stretch for making the billhook perform the first and second full rotation respectively when said disc is rotated, for forming the first and the second knot, respectively. The disc is provided with a recess downstream of at least one of said first gear stretch and said second gear stretch. An obstacle is arranged for engaging the pinion when moving in the recess. The recess and obstacle are configured to rotate said pinion over a determined angle and back in order to move the upper lip of the billhook away from the lower lip and back after at least one of said first full rotation and said second full rotation.

By rotating the pinion over a determined angle and back in order to move the upper lip of the billhook away from the lower lip and back after the first full rotation and/or after the second full rotation, the forming of a first and/or second loop knot is improved. Indeed, by briefly opening the billhook after the first full rotation and/or after the second full rotation, a first and/or second loop knot can be formed and the first and/or second loop knot is released from the billhook in a more secure manner. In that manner the knotter settings are less critical and the twine type and quality is less critical. In addition, the recess in the knotter disc and the obstacle are simple and robust features which can be easily added in existing knotter systems.

Preferably, the obstacle is a spring mounted element fixed to the disc. More preferably the obstacle is any one of the following: a spring-mounted arm, a spring mounted wheel. Such a spring-mounted obstacle is simple and robust and allows the pinion to be accurately pressed/rotated into the recess and returned/counter-rotated when released.

Preferably, the recess extends along the circumference of the disc over an angular distance of 10-90 degrees, preferably 20-60 degrees, more preferably between 30 and 50 degrees. In that manner a brief opening of the billhook is obtained which does not hinder the other moving components during the knotter cycle.

In an exemplary embodiment, at least one of the first gear stretch and the second gear stretch has an outer gear stretch arranged on an outwardly protruding portion of the disc, and an inner gear stretch delimited by a downstream and upstream bottom land portion; and the pinion comprises an outer teeth range configured to cooperate with the outer gear stretch, and an inner teeth range configured to cooperate with the inner gear stretch, said inner teeth range being delimited by a contact portion configured to rotate in said downstream and upstream bottom land portion and to slide over the disc when the pinion is not engaged with the first or second gear stretch. Such an embodiment allows for a good control of the rotation of the billhook during the first and second knot forming cycle.

In an exemplary embodiment the recess is configured to receive the contact portion and to cause the contact portion to rotate over the determined angle and back. The contact portion may have a slightly curved contact surface.

Preferably, the recess, the inner gear stretch and the downstream and upstream bottom land portions are positioned on the same ring-shaped path around an axis of the disc.

Preferably, the angular distance between the recess and the downstream bottom land portion is smaller than 30 degrees, preferably smaller than 20 degrees. In that manner the additional opening of the billhook immediately follows the first and/or second full rotation of the billhook, and does not significantly impact the knotter cycle.

Preferably the obstacle is configured to engage the outer teeth range of the pinion, such that the pinion is rotated into the recess. This outer teeth range protrudes out of the recess and can be easily engaged by the obstacle.

Preferably the recess, seen in a downstream direction, slopes first gradually downwardly and next gradually upwardly. In that manner the pinion can rotate gradually in the normal rotation direction and then in a counter-rotation direction, while passing over the recess.

In an exemplary embodiment the billhook assembly is configured to position the upper lip away from the lower lip in a first angular range and to position the upper lip away from the lower lip in a second angular range of at least one of the first and second full rotation, wherein the first angular range is located within a range between 0° and 160°, and the second angular range is located within a range between 160° and 360°, wherein 0° corresponds with a start position of the billhook assembly. By positioning the upper lip away from the lower lip in the first angular range, i.e. by opening the billhook after the twines have been draped over the billhook, the twines can be moved backwards on the billhook in the direction of the pivot point between the lower lip and the upper lip, thus ensuring that the twines are properly positioned on the billhook. In the second angular range the open billhook allows to perform the knotting, wherein twines are positioned between the lower lip and the upper lip as in prior art solutions. The opening of the billhook in the first angular range can be done both in the first knot forming cycle and in the second knot forming cycle.

In an exemplary embodiment the billhook assembly is configured to move the upper lip away from the lower lip and back a first time in the first angular range and to move the upper lip away from the lower lip a second time in the second angular range. Such an embodiment has the advantage that the billhook may be briefly opened during the first angular range and then closed again, in order not to hinder the movement of other components, such as the swing arm, see further, during a knot forming cycle.

In another exemplary embodiment the billhook assembly is configured to move the upper lip away from the lower lip in the first angular range and to move the upper lip back to the lower lip in the second angular range. In other words, in such an embodiment the billhook is opened in the first angular range and remains open until the end of the first angular range. In such an embodiment, the billhook may e.g. be opened a little in the first angular range and then opened more in the second angular range.

In an exemplary embodiment the first angular range is located within a range between 0° and 130°, preferably within a range between 0° and 90°. By performing the first opening of the billhook at the beginning of the rotation, the twines can be positioned properly right at the beginning.

In an exemplary embodiment the billhook assembly comprises a cam surface, and the billhook is provided with a cam follower in contact with the cam surface. The cam surface may be provided with a first and a second cam configured for pushing the upper lip away from the lower lip, in the first angular range and in the second angular range, respectively, during said first full rotation and during said second full rotation. In another embodiment the cam surface may be provided with a single cam causing the billhook to open in the first angular range and to remain open in the second angular range. Embodiments with a cam surface and cam follower have the advantage that the opening of the billhook is well controlled and predictable. However, it is also possible to give an upper lip of the billhook a suitable shape and weight such that it is opened automatically during the first angular range. More in particular the upper lip may be provided with a hook-like end part protruding in the direction of the lower lip. The hook-like end part has an inner face making an obtuse angle α with a lower face of an elongate portion of the upper lip. By increasing the angle the billhook can be more easily opened by a strand. When such an embodiment is used an appropriate compromise has to be found between the shape of the upper lip, and in particular of the hook-like end part, and the tension in strands. In an exemplary embodiment the billhook assembly is configured to position the upper lip away from the lower lip in the first angular range of the first full rotation and to position the upper lip away from the lower lip in the second angular range of the first full rotation, and to position the upper lip away from the lower lip in the first angular range of the second full rotation and to position the upper lip away from the lower lip in the second angular range of the second full rotation. In other words, it is preferred to do the opening of the billhook in the first angular range, both during the first knot forming cycle and during the second knot forming cycle. When a cam surface and upper lip with cam follower is used, it is clear that this it is desirable to use the same cam surface for the first and the second knot forming cycle, so that the opening/closing cycle of the billhook is the same during the first and the second knot forming cycle.

In an exemplary embodiment the knotter system further comprises a twine receiver and a swing arm. The twine receiver may be configured for holding the needle twine and the tucker twine. The swing arm may be adapted for cutting twines between the billhook and the twine receiver. The drive means may then be further configured to move the swing arm a first time from a rest position to an extended position and back during the first knot forming cycle and a second time during the second knot forming cycle. In an exemplary embodiment the drive means comprise a cam track and a cam follower, said cam follower being connected with the swing arm, and said cam track being provided in said disc or in a member mounted for rotating synchronously with said disc, and being adapted for moving the swing arm a first time and a second time during the first and the second knot forming cycle, respectively.

In an exemplary embodiment the knotter system further comprises a twine finger. The twine finger may be configured for guiding at least the needle twine, said twine finger being mounted moveably below the billhook and the swing arm. The drive means may then be further configured to move the twine finger at least a first time during the first knot forming cycle and a second time during the second knot forming cycle.

Preferably the swing arm is configured for sweeping a formed knot from the billhook during the first knot forming cycle and during the second knot forming cycle, respectively.

Preferably the twine receiver is adapted to let the twines slip during the second knot forming cycle so that cutting of the needle and tucker twine is avoided when forming the second knot. By allowing the twines to slip during the second full rotation of the billhook, the cutting of the twines is avoided.

According to an exemplary embodiment, the twine receiver comprises a twine disc and a twine holder. The twine holder is adapted to clamp twines against the twine disc. The knotter system may further comprise second drive means adapted for rotating the twine disc during a first turn whilst clamping twines for forming the first knot, and for rotating the twine disc during a second turn whilst letting twines slip for the forming of the second knot. According to an exemplary embodiment, the twine disc is provided with at least a first and a second notch for receiving the twines. The twines are typically in the first notch during the first turn and in the second notch during the second turn. Note however that during the beginning of the second turn, end parts of the twines may still be in the first notch. However, during the forming of the second knot, the end parts will slip first out of the first notch and then out of the second notch. According to a possible embodiment, the second notch is shaped in such a way that the twines are allowed to slip out of the second notch during forming of the second knot. According to another possible embodiment, the twine receiver is provided with biasing means for setting a bias for the clamping action by the twine holder. The biasing means may then be adapted to set a first bias during the first turn, and a second bias during the second turn. The first bias is chosen such that the twines are firmly clamped, while the second bias is chosen such that the twines are allowed to slip out of the twine receiver.

According to a preferred embodiment, the swing arm is provided with a cutter and a removal means. The cutter is adapted for cutting twines between the billhook and the twine receiver, whilst moving from the rest position to the extended position, and the removal means are adapted for sweeping twines from the billhook whilst moving from the rest position to the extended position. Typically, the removal means have a shape which is complementary to the shape of the billhook in order to facilitate the removal of the twines.

According to another aspect of the invention there is provided a baler comprising a plurality of knotter systems according to any one of the embodiments defined above.

BRIEF DESCRIPTION OF THE DRAWINGS

The advantages of this invention will be apparent upon consideration of the following detailed disclosure of exemplary non-limiting embodiments of the invention, especially when taken in conjunction with the accompanying drawings wherein:

FIGS. 3A-3D are exploded perspective views of an exemplary embodiment of a double knotter system of the invention, looking from different angles;

FIGS. 9A to 9I are fragmentary, schematic views illustrating the successive steps of a second knot forming cycle of a double-knotting operation.

DESCRIPTION OF THE DRAWING

In the description which follows and in certain passages already set forth, the principles of the present invention will be described in terms of "twine" and "knots" formed in such twine. However, it is to be recognized that such principles extend to wire and twisted junctions of wire as well as twine and knots.

Many of the fastening, and connection processes, and other means and components utilized in this invention are widely known and used in the field of the invention described, and their exact nature or type is not necessary for an understanding and use of the invention by a person skilled in the art, and therefore they will not be discussed in significant detail. Also, any reference herein to the terms "left" or "right" are used as a matter of mere convenience, and are determined by standing at the rear of the machine facing in its normal direction of travel.

Figure 1:
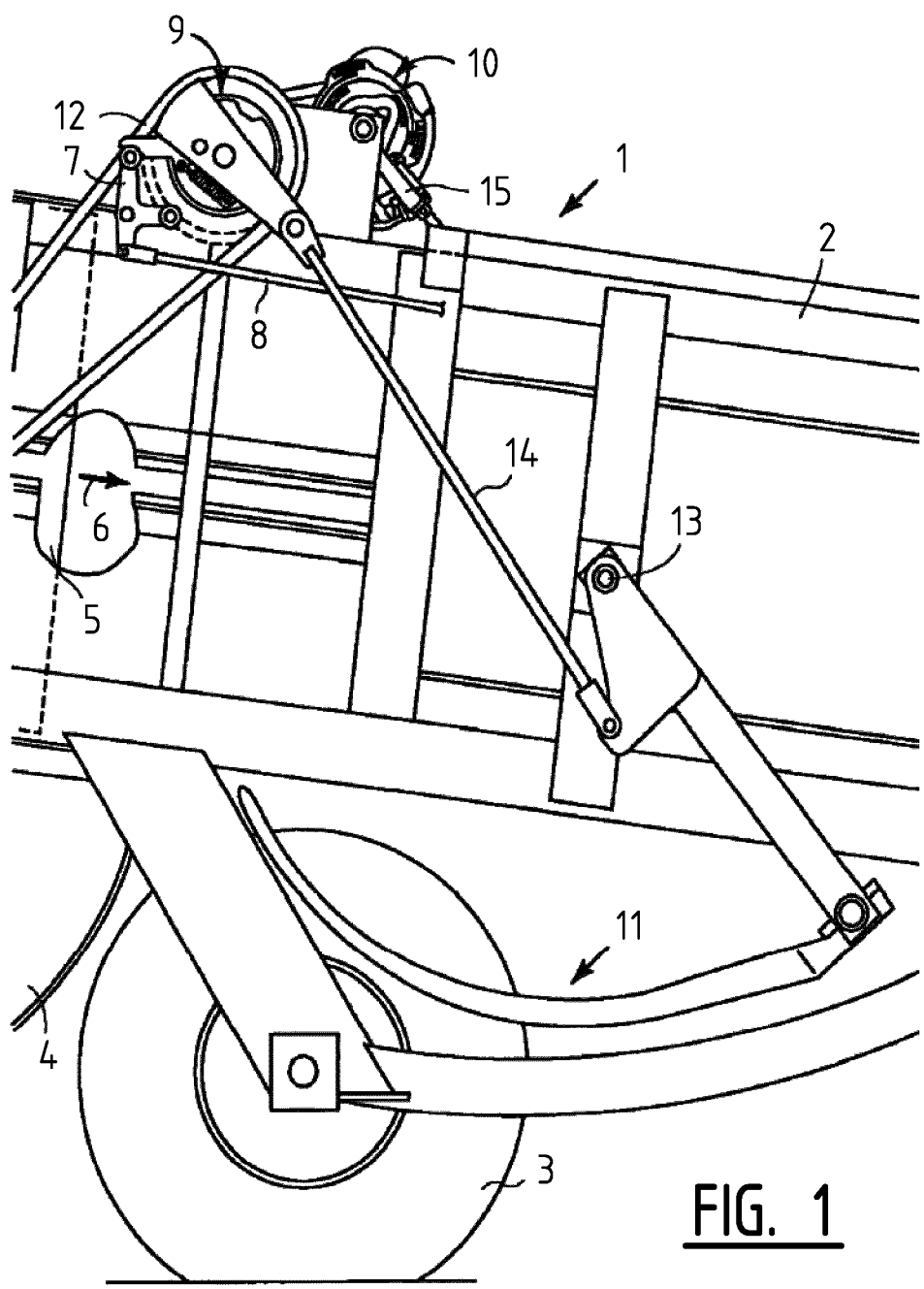
FIG. 1 is a fragmentary, side elevational view of a baler having a double knotter tying mechanism.

The baler 1 illustrated in FIG. 1 has a rectangular bale case 2 that is supported by ground wheels 3. The bale case 2 defines a bale chamber wherein material is pushed in through a curved duct 4. A plunger 5 reciprocates within the bale case to intermittently pack fresh charges of material from the duct 4 rearward in the chamber in the direction of the arrow 6. When the bale reaches a predetermined size, a trigger 7 is pulled by a rod 8. This rod 8 engages a dog clutch 9, the clutch 9 in turn being connected to a tying mechanism 10 and a set of needles 11. As will be appreciated, the tying mechanism comprises a set of individual knotters 10 provided crosswise on top of the bale chamber at intervals. Each knotter 10 has an associated needle 11 for assisting in forming an individual loop around a finished bale. When the bale needs tying, the dog clutch 9 connects the knotters 10 and their needles 11 via a drive chain 12 to a source of driving power to initiate the tying operation. As the individual knotters 10 all operate in an identical manner, it suffices to describe the present invention in relation to only one such knotter 10.

Figure 1A:
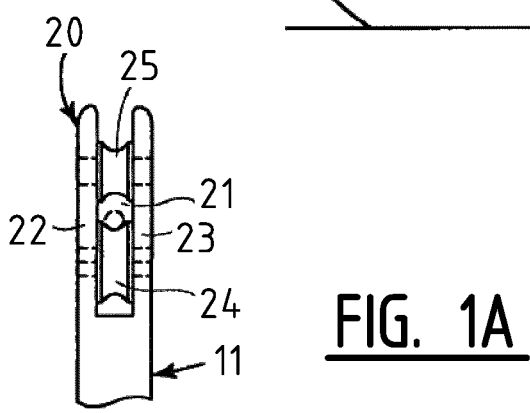
FIG. 1A is a detailed view of a needle end portion.

The needle 11 is swingably mounted on the bale case 2 by a pivot 13 and is swung back and forth across the bale chamber by a linkage 14, which is activated by the clutch 9. The needle 11 has an "at-home" or rest position fully below the bale case 2 as illustrated in FIG. 1 and a "full-throw" position extending completely across the bale case 2 as illustrated, for example, in FIG. 6C. As illustrated in FIG. 1A, the tip 20 of needle 11 has an eyelet 21 defined therein by the opposed furcations 22 and 23 of the bifurcated tip 20 in conjunction with a pair of longitudinally spaced, transversely extending rollers 24 and 25.

Figure 2:
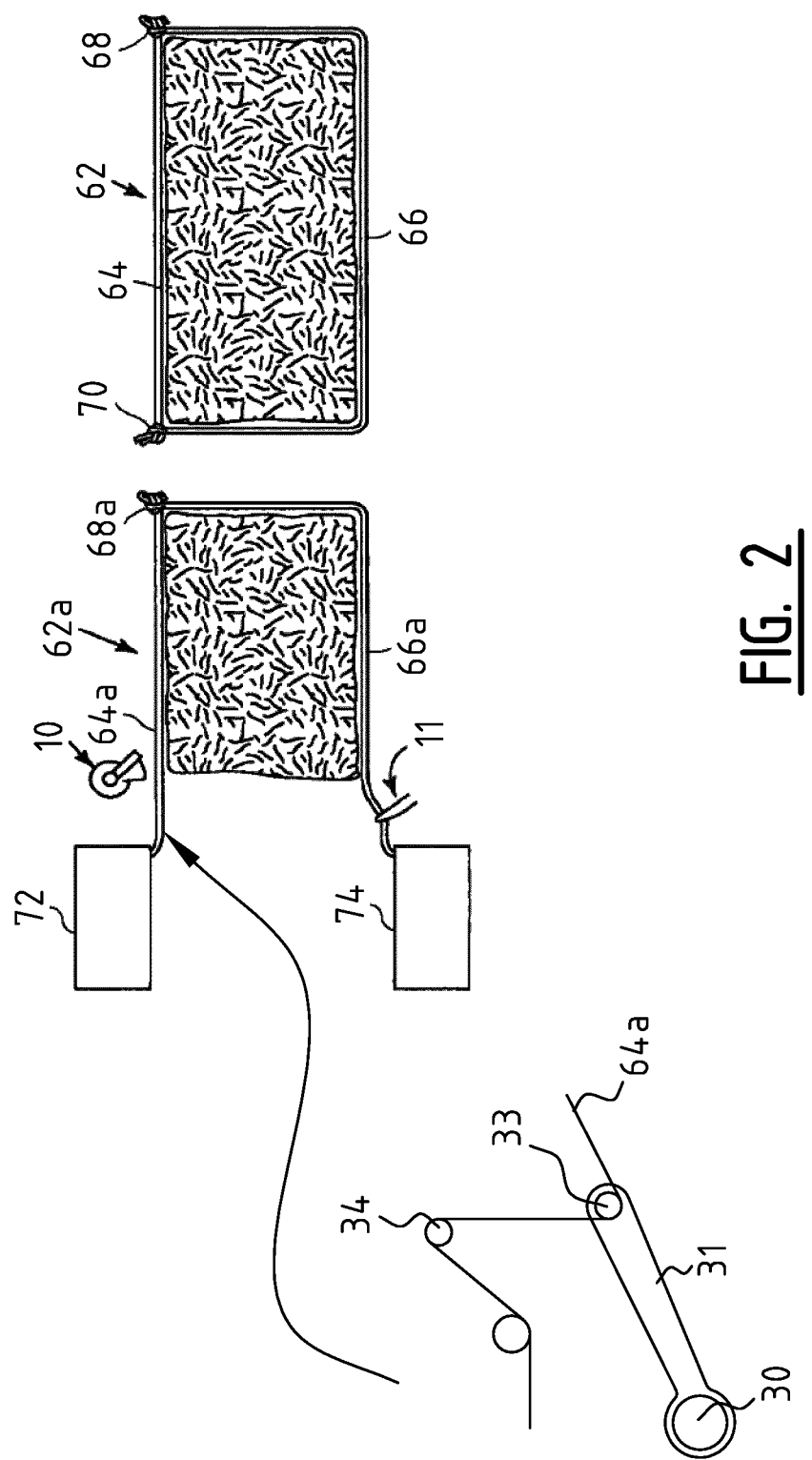
FIG. 2 is a diagrammatic view of a complete and a partial double-knotted loop without the forming of twine tails.

With reference to FIG. 2, to the left of loop 62 is a partial loop 62a which is in the process of being formed. The already completed bale on the right is wrapped by a loop 62 formed by a top and bottom twine 64, 66 which are knotted in the two top corners of the bale, see knots 68 and 77. The partial loop 62a around the bale that is being formed comprises a top twine 64a (also called tucker twine) and a bottom twine 66a (also called needle twine). The top twine 64a emanates from a source of twine supply 72, while the bottom twine 66a emanates from an entirely separate, second source of twine supply 74. At the particular point in the sequence chosen for illustration, a knot 68a (this is the second knot of an already executed knotter cycle where knot 70 was formed as the first knot and knot 68a as the second knot) is in existence, and the bale is approaching that length where the needle 42 is ready to swing into operation and present the twines 64a and 66a to the knotter 40 to start a knotter cycle in which two consecutive knots are being formed. In a finished bale, the loop 62 is made from two strands of binding material, i.e., one strand of twine 64 along the top side of the bale and a second strand of twine 66 along the bottom side of the bale and its two opposite, vertical ends. The strands of twine 64 and 66 together form the continuous loop 62. Together, they fully circumscribe the bale. The knot 70 (this is the first knot of a knotter cycle) is typically a traditional knot. The knot 68, 68a of a bale (this is the second knot of a knotter cycle) may be a traditional knot or a so called loop-knot. In a loop-knot the ends of the twines 64, 64a and 66, 66a of the knot 68, 68a are released from a retained position so they can be pulled back as will be described further to form a small loop on top of the knot. The knot 68, 68a itself holds the ends of the twines 64, 64a and 66, 66a united with the knot 68, 68a.

The knotter is similar in many respects to the knotters disclosed in US2006/0012176, WO2015/014616 and WO2014/060245 in the name of the Applicant, and the disclosure of those documents is herein incorporated by reference.

With this short explanation in mind, the details of the embodiments according to the present invention will now be described. FIGS. 3A-D illustrate a first embodiment of a knotter 10 according to the invention. For convenience the same reference numerals have been used for referring to similar elements in the different embodiments.

The knotter 10 of FIGS. 3A-D comprises a generally circular element, also called knotter disc 501 that is secured to a drive shaft 502 for rotation with the latter through one full revolution when the clutch 9 is engaged. The shaft 502 is typically supported by a forwardly inclined frame 15 (see FIG. 1) attached to the top of the bale case 2, and the frame 15 also supports the knotter components for forming the knots in response to rotation of the knotter disc 501.

Figure 5:
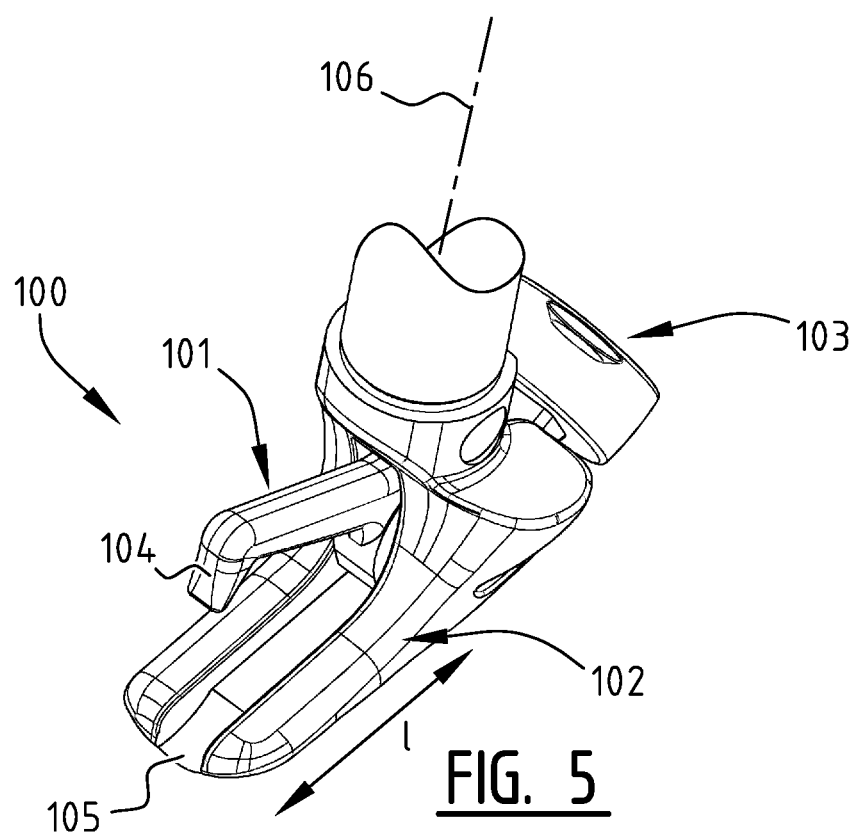
FIG. 5 is a perspective view of an exemplary embodiment of a billhook.

The knotter components include a rotary billhook 100, supported by the frame 15 for rotation about an inclined axis 106 (see FIG. 5); a twine disc 201 rearward of and adjacent to the billhook 100 for holding top and bottom twines 64a and 66a in position for engagement by the billhook 100 during rotation of the latter; and a swing arm 400 pivotally attached to the frame 15 by a bolt 420. The top and bottom twines 64a and 66a are held in notches 211, 212 in the rotating twine disc 201 by a retainer or twine holder 202, see FIG. 3D. The tensioning force of this retainer 202 to the twine disc 201 can be adjusted manually by changing the tension of a leaf-spring 220 when a bolt is loosened or tightened.

Figure 4A:
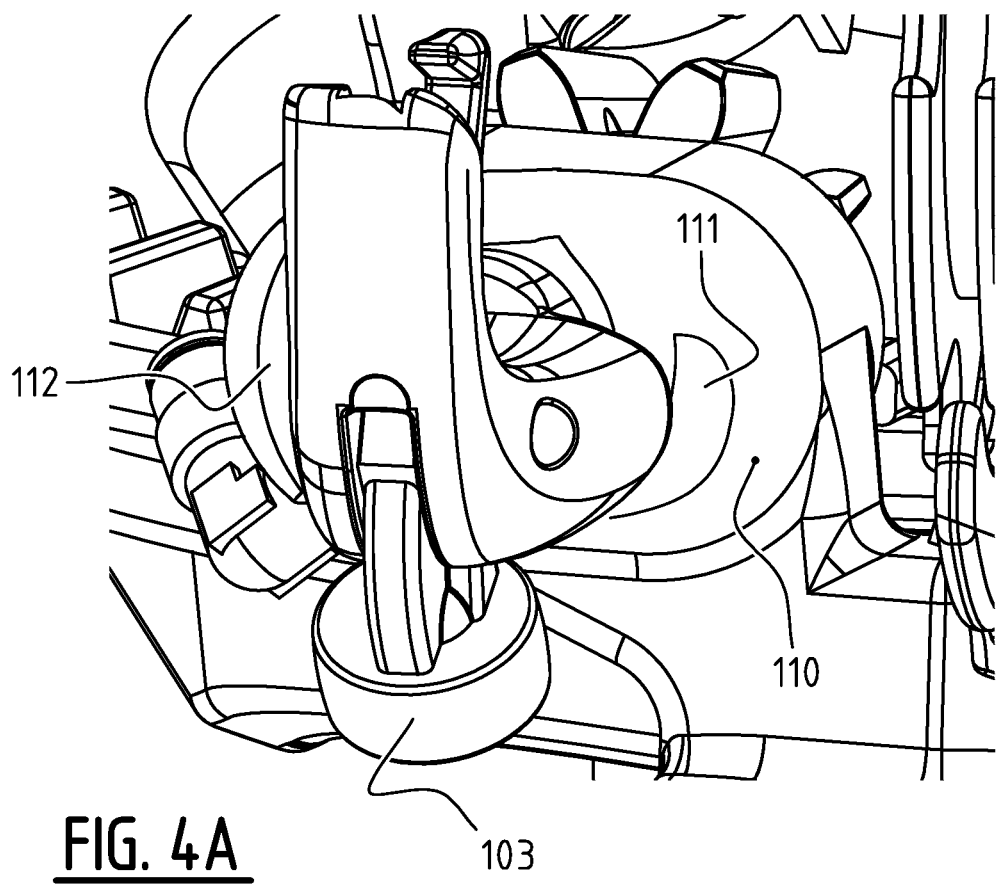
FIG. 4A, is a perspective view of a billhook assembly according to an embodiment.
Figure 9A:
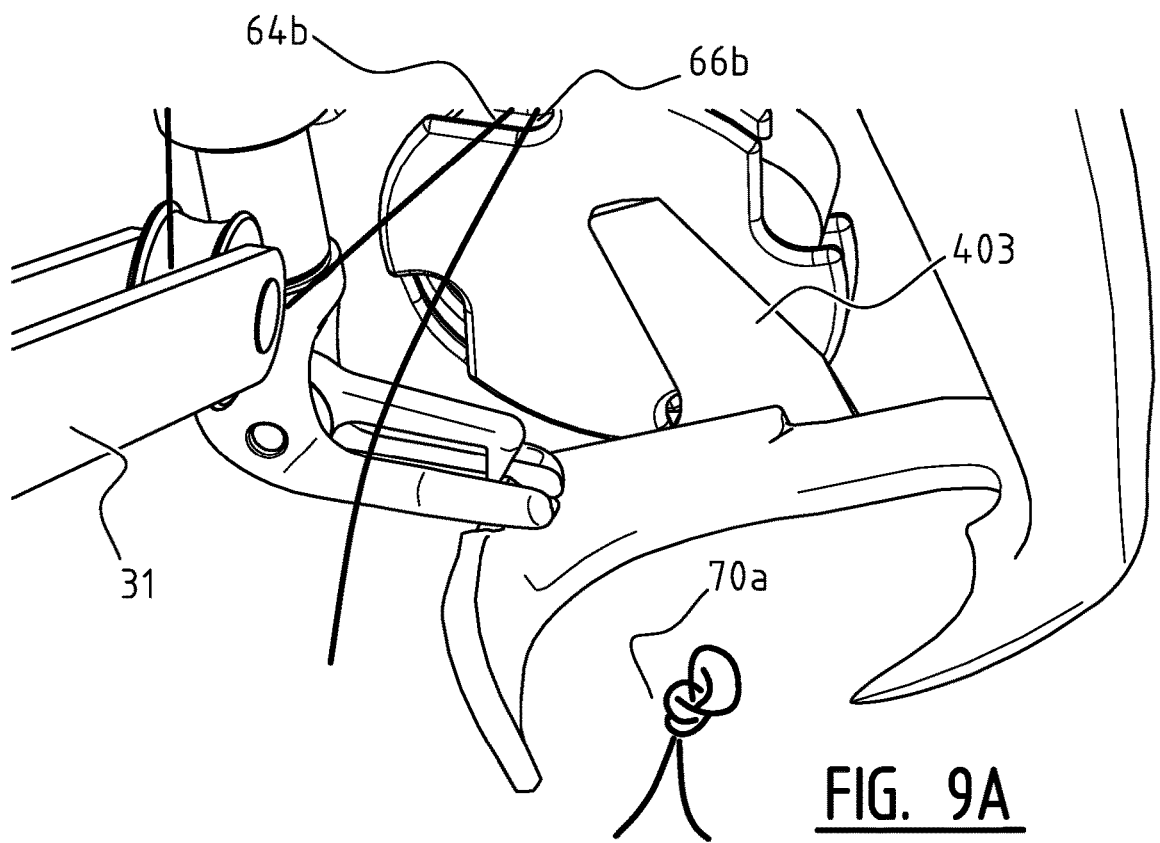
Figure 9B:
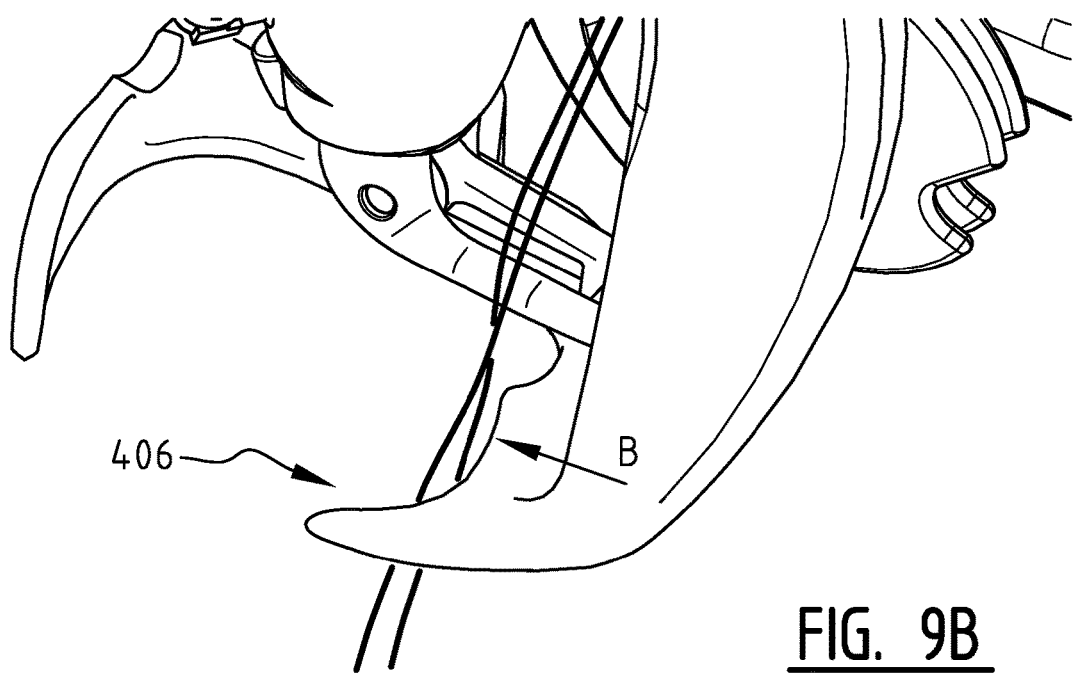

The billhook assembly is illustrated in detail in FIG. 4A and comprises a billhook 100 and a cam surface 110. The billhook 100 is shown in detail in FIG. 5 and comprises a lower lip 102, and an upper lip 101 connected around a pivot point with the lower lip 102. During a tying cycle, the billhook 100 performs at least a first full rotation around its rotation axis 106 during a first knot forming cycle and a second full rotation around its rotation axis 106 during a second knot forming cycle. When the billhook 100 rotates around its axis 106, a cam follower 103, which is connected to the upper lip 101, engages a cam surface 110 having a first cam 111 and a second cam 112. When rotating over the first cam 111 or over the second cam 112, the cam follower 103 will push the upper lip 101 away from the lower lip 102. As will be explained in detail below, during the first knot forming cycle, the first cam 111 will cause a first opening of billhook 100 (i.e. the upper lip 101 moving away from the lower lip 102) to ensure a good positioning of the twines 64a and 66a on the billhook 100, see FIG. 6E, and the second cam 112 will cause a second opening of billhook 100 enabling the twines 64a and 66a to enter in between the two lips 101 and 102 while the billhook 100 is rotated. In other words, the billhook assembly is configured to position the upper lip 101 away from the lower lip 102 in a first angular range 121 of the first full rotation and to position the upper lip 101 away from the lower lip 102 in a second angular range 122 of the first full rotation. Similarly, as will be explained in detail below, during the second knot forming cycle, the first cam 111 will cause a first opening of billhook 100 to ensure a good positioning of the twines 64b and 66b on the billhook 100, see FIG. 9C, and the second cam 112 will cause a second opening of billhook 100 enabling the twines 64b and 66b to enter in between the two lips 101 and 102, see FIG. 9E. In other words, the billhook assembly is configured to position the upper lip 101 away from the lower lip 102 in a first angular range 121 of the second full rotation and to position the upper lip 101 away from the lower lip 102 in a second angular range 122 of the second full rotation. Since the same cam surface with the first and second cam 111, 112 is used for the first and second full rotation of billhook 100, the first and second angular ranges 121, 122 are also the same for the first and second full rotation. The first angular range 121 is located within a range between 0° and 160°, and the second angular range 122 is located within a range between 160° and 360°. Preferably, the first angular range is located within a range between 0° and 130°, more preferably within a range between 0° and 90°.

Figure 4B:
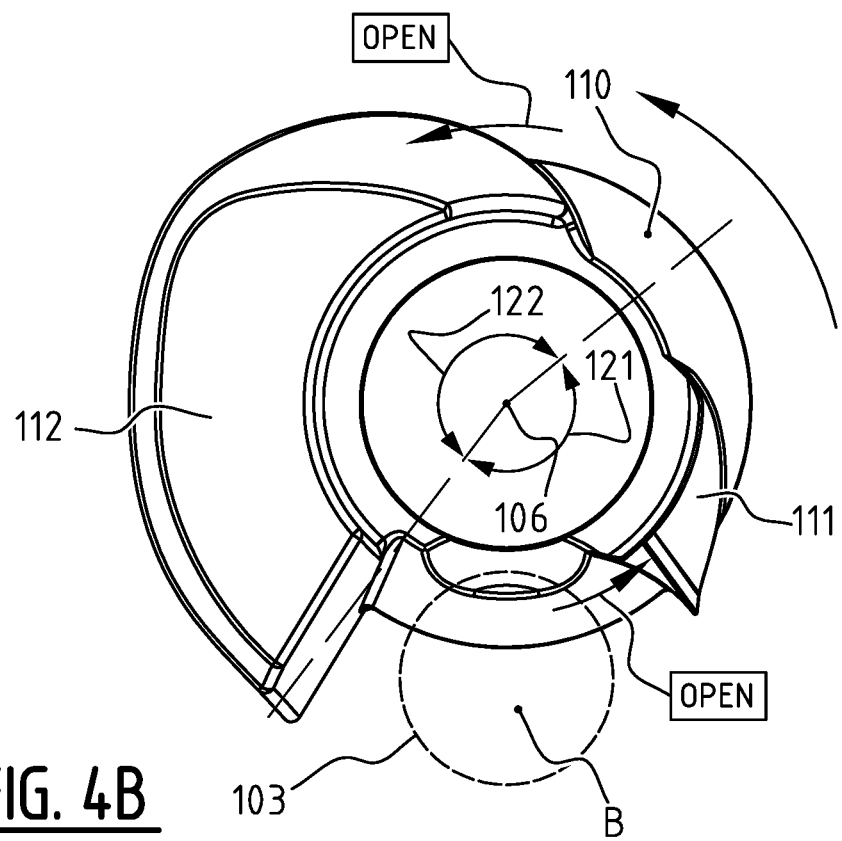
FIG. 4B is a schematic bottom view of the cam surface of the billhook assembly of FIG. 4A.

The first and second angular range are schematically illustrated in FIG. 4B. Reference B indicates a start position for the cam follower 103, and arrow R indicates the rotational direction of the billhook 100. In the start position B the cam follower 103 may be positioned between the second cam 112 and the first cam 111 (FIG. 4B). Alternatively, in the start position B, the cam follower 103 may be positioned at the beginning of the first cam 111, i.e. in a position in which the billhook 100 is open (FIG. 4B). When the first rotation starts, the billhook 100 is opened a first time in the first angular range 121 of the first rotation when the cam follower 103 passes over the first cam 111. Next the billhook is closed again as the cam follower leaves the first cam 111. When the cam follower 103 enters the second angular range 122, the billhook 100 is opened a second time when it reaches the first end of the second cam 112. The same sequence is followed for the second full rotation.

In the illustrated embodiment two cams 111, 112 are provided such that the upper lip 101 is moved away from the lower lip 102 and back a first time in the first angular range and moved away from the lower lip 102 and back a second time in the second angular range. However, in other embodiments there could be provided one long cam extending from the first angular range 121 to the second angular range 122, such that the billhook 100 remains open, and does not close fully between the two ranges. In other words, the billhook assembly is configured to move the upper lip 101 away from the lower lip 102 in the first angular range and to move the upper lip 101 back to the lower lip 102 in the second angular range. For example, the cam may be adapted such that in the first angular range the billhook 100 opens only a little whilst opening fully in the second angular range.

The length l of the lower lip 102 measured from the pivot point is preferably larger than 35 mm, in order to ensure that the twines can be properly placed on the billhook 100 and do not slide off the billhook 100. The upper lip 101 is provided at a free end thereof with a downwardly protruding end part 104, and the lower lip 102 is provided with an end recess 105 for receiving said protruding end part. In that way the upper lip 101 can be placed against or very close to the lower lip 102 ensuring an improved stripping of the knot formed on the billhook 100.

The foregoing described movement on the part of the billhook 100 and the twine disc 201 are brought about by operable inter-engagement of the gear stretches 504, 505 and gear sections 605, 606, 606', 606" on the knotter disc 501 with their respective gears 503 and 604 on the billhook 100 and the twine disc 201.

Now the drive means adapted to make the billhook 100 perform at least a first full rotation around its rotation axis 106 during the first knot forming cycle and a second full rotation around its rotation axis 106 during the second knot forming cycle will be described in more detail. The drive means comprise a pinion 503 and at least a first and second gear stretch 504, 505 provided along the circumference of the knotter disc 501, see FIG. 3A-3F. Pinion 503 is adapted to cooperate with said first and second gear stretch 504, 505 for making the billhook 100 perform the first and second full rotation respectively when said disc is rotated for forming the first and the second knot, respectively. Pinion 503 is disposed for meshing engagement with at the first and a second circumferentially spaced gear stretches 504, 505 on the knotter disc 501.

Figure 3C:
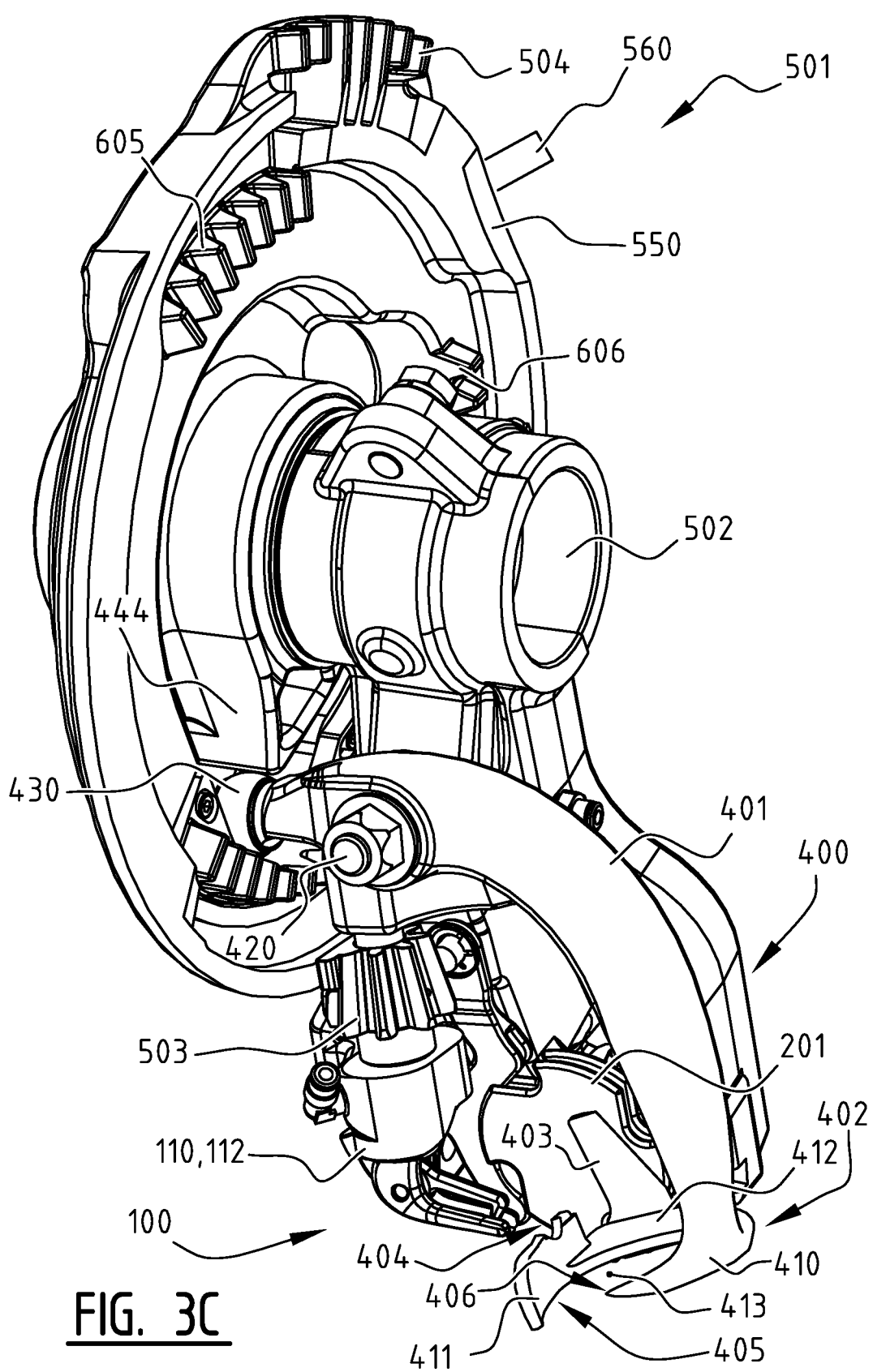
Figure 3E:
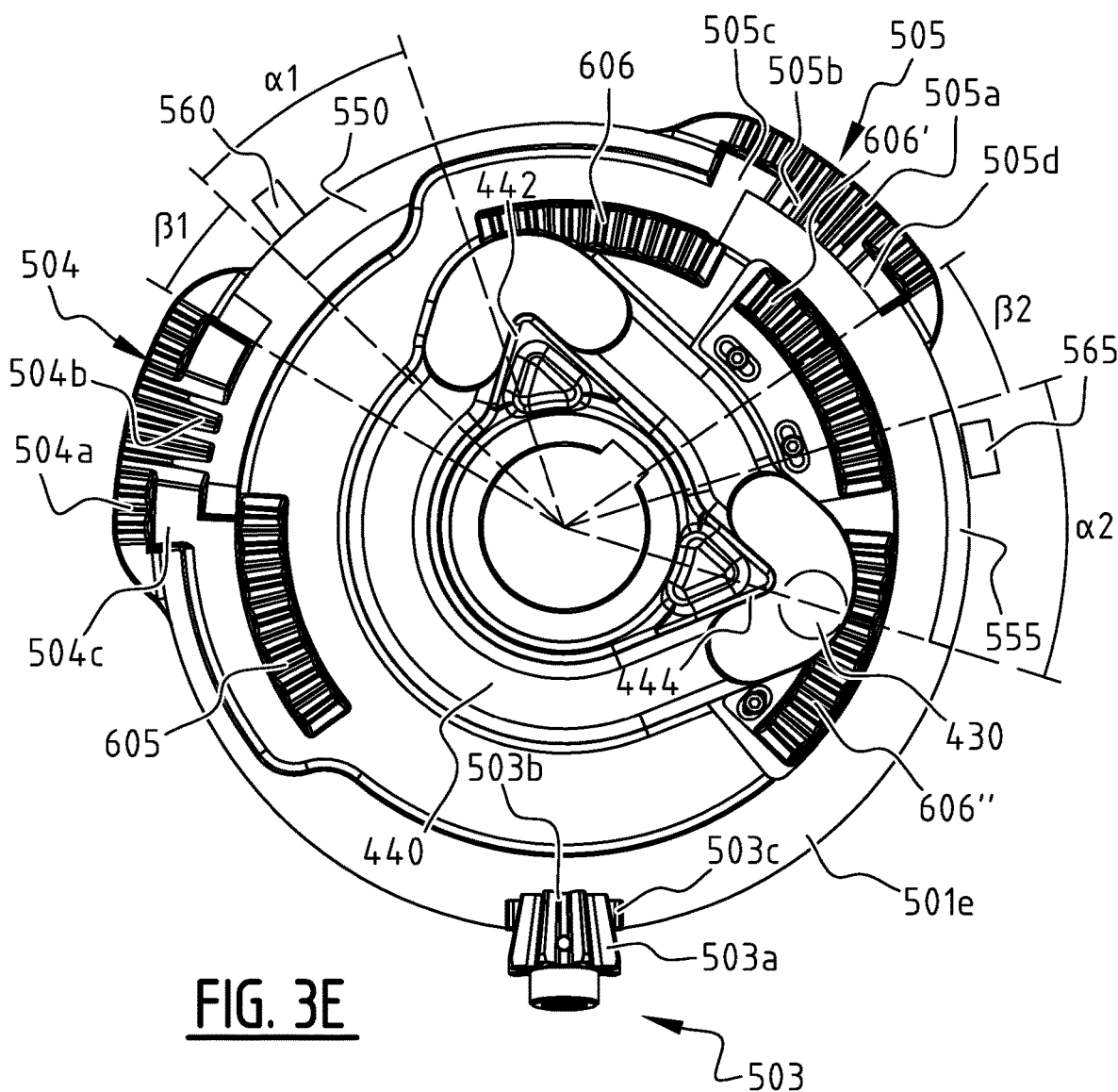
FIG. 3E is a top view of an exemplary embodiment of a knotter disc of a double knotter system of the invention.

The knotter disc 501 is provided with a first recess 550 downstream of first gear stretch 504 and with a second recess 555 downstream of second gear stretch 505, when looking into the direction of movement of pinion 503 relative to knotter disk 501, see FIG. 3E. It is also possible to have only the first recess 550 or only the second recess 555. For each recess 550, 555 an obstacle 560, 565 is arranged for engaging pinion 503 when pinion 503 moves in recess 550, 555. The first recess 550 and the first obstacle 560 are configured to rotate pinion 503 over a determined angle and back in order to move upper lip 101 of billhook 100 away from lower lip 102 and back after the first full rotation. The second recess 555 and the second obstacle 565 are configured to rotate pinion 503 over a determined angle and back in order to move upper lip 101 of billhook 100 away from lower lip 102 and back after the second full rotation.

The obstacle 560, 565 may be a spring mounted element fixed to the knotter disc 501. In the illustrated embodiment the first obstacle 560 is a spring-mounted arm and the second obstacle 565 is a spring-mounted wheel. More generally, both obstacles may be the same or different.

Both the first recess 555 and the second recess 565 extends along the circumference of the disc over a first angular distance α1 and a second angular distance α2 of 10-90 degrees, preferably 20-60 degrees, more preferably between 30 and 50 degrees.

Figure 3F:
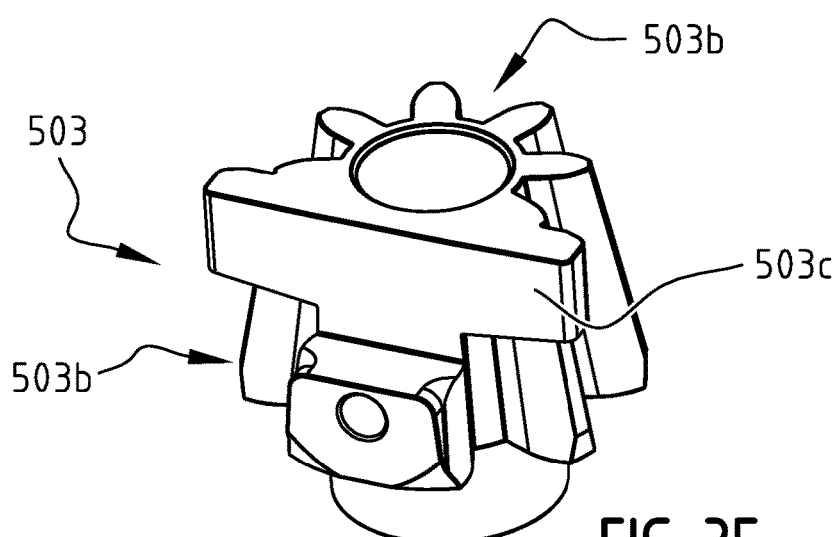
FIG. 3F is a perspective view of a pinion for use in the exemplary embodiments of FIGS. 3A-3E.

As best illustrated in FIG. 3E, the first gear stretch 504 has an outer gear stretch 504a arranged on an outwardly protruding portion of the knotter disc 501, and a inner gear stretch 504b delimited by a downstream and upstream bottom land portion 504c, 504d. Similarly, the second gear stretch 505 has an outer gear stretch 505a arranged on an outwardly protruding portion of the knotter disc 501, and a inner gear stretch 505b delimited by a downstream and upstream bottom land portion 505c, 505d. As best illustrated in FIG. 3F, pinion 503 comprises an outer teeth range 503a configured to cooperate with the outer gear stretch 504a, 505a, and an inner teeth range 503b configured to cooperate with the inner gear stretch 504b, 505b. The inner teeth range 503b is delimited by a contact portion 503c. Contact portion 503c is configured to rotate in the downstream and upstream bottom land portion 504c, 504d; 505c, 505d and to slide over a circumferential edge 501e of the top surface the knotter disc 501 when pinion 503 is not engaged with the first or second gear stretch 504, 505, see FIGS. 3E and 3F. Preferably contact portion 503c has a substantially flat contact surface. The first and second recess 550, 555, the inner gear stretches 504b, 505b and the downstream and upstream bottom land portions 504c, 504d; 505c, 505d are positioned on the same circular path around an axis of the knotter disc 501. Preferably, the angular distance 131 between the first recess 550 and the downstream bottom land portion 504d is smaller than 30 degrees, more preferably smaller than 20 degrees. Similarly, the angular distance 132 between the first recess 555 and the downstream bottom land portion 505d is smaller than 30 degrees, more preferably smaller than 20 degrees. The first recess 555 is curved and, seen in a downstream direction, slopes first gradually downwardly and next gradually upwardly. Similarly, the second recess 565 is curved and, seen in a downstream direction, slopes first gradually downwardly and next gradually upwardly.

The first obstacle 560 is configured to engage the outer teeth range 503b of the pinion 503 whilst the pinion passes in the first recess 550. Similarly, the second obstacle 565 is configured to engage the outer teeth range 503b of the pinion 503 whilst the pinion passes in the second recess 555.

Pinion 503 performs a first full rotation whilst passing over the first gear stretch 504: during this rotation one outer end of contact portion 503c rotates in upstream land bottom portion 504c, and the other end of contact portion 503c rotates in downstream land bottom portion 504d. Next, when passing in first recess 550 pinion 503 is rotated over a small angle when entering the first recess 550, and rotated back over the same small angle when leaving the first recess 550. Then pinion 503 performs a second full rotation whilst passing over the second gear stretch 505: during this rotation one outer end of contact portion 503c rotates in upstream land bottom portion 505c, and the other end of contact portion 503c rotates in downstream land bottom portion 505d. Next, when passing in second recess 555 pinion 503 is rotated over a small angle when entering the second recess 565, and rotated back over the same small angle when leaving the second recess 565.

Figure 6A:
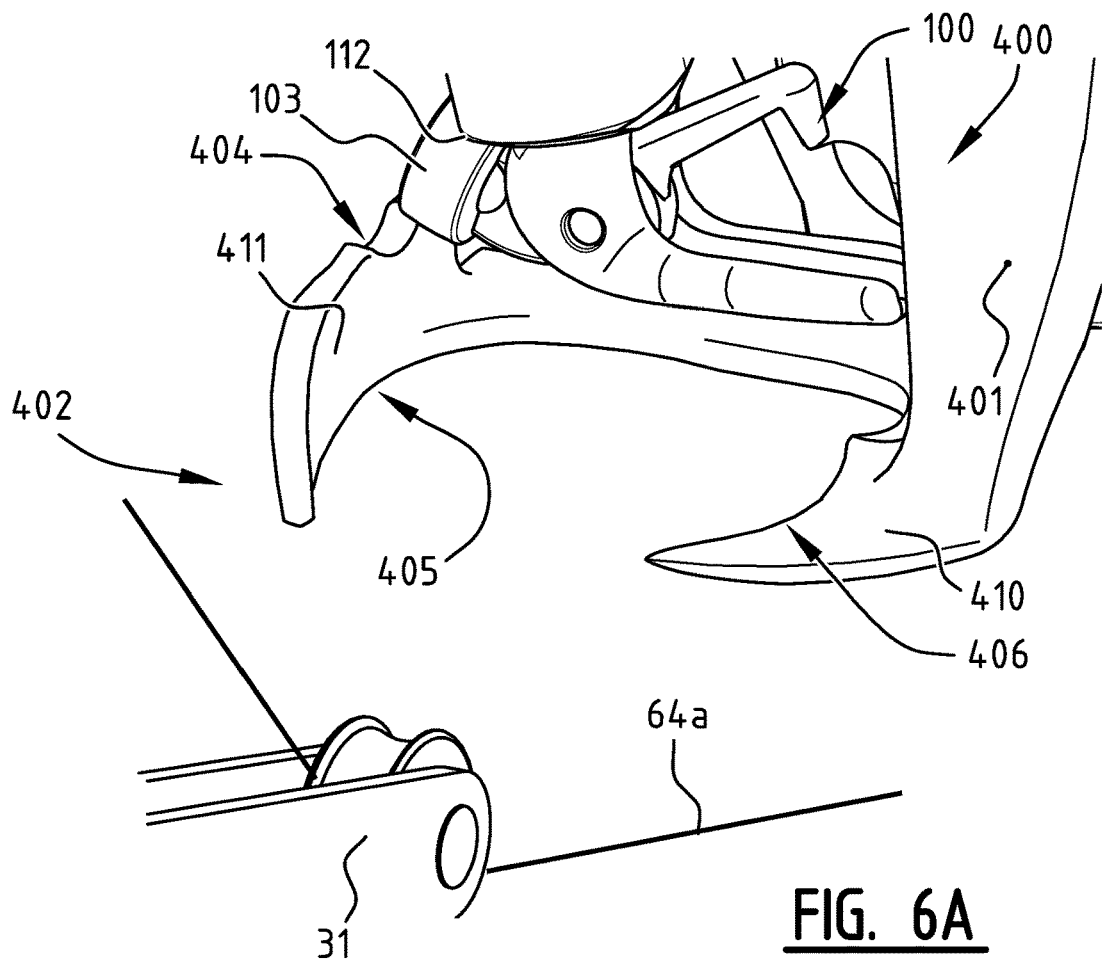
FIGS. 6A to 6J are fragmentary, schematic views illustrating the successive steps of a first knot forming cycle of a double-knotting operation.
Figure 6B:
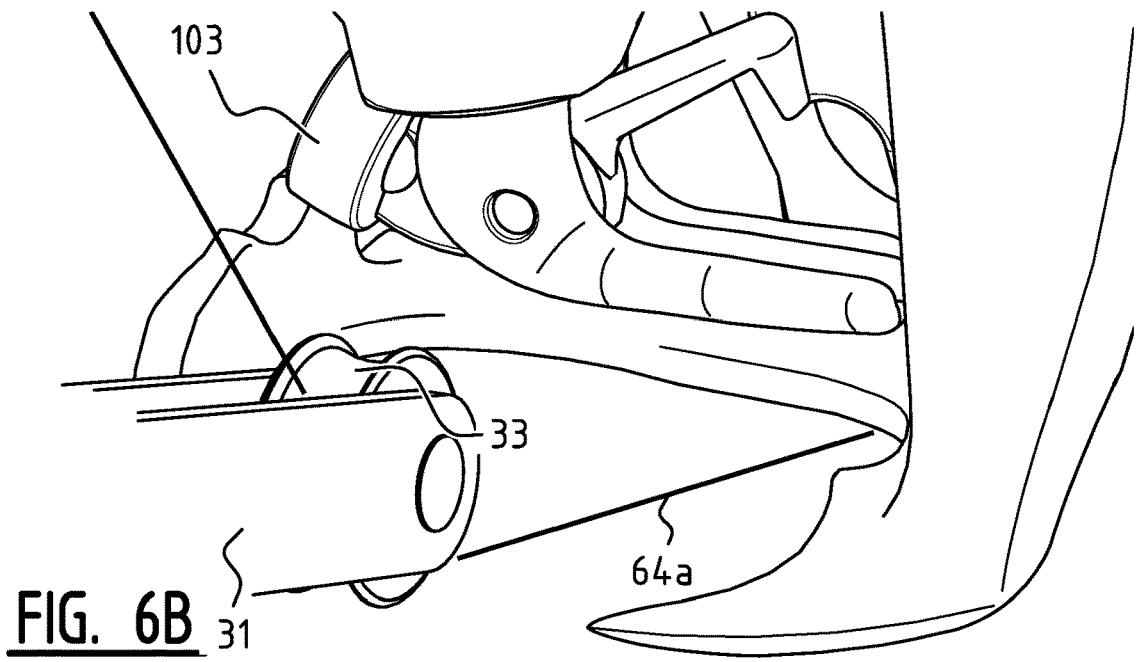

As best illustrated in FIG. 3C, the swing arm 400 has an arm portion 401 and a lower end portion 402 and is arranged for moving the lower end portion 402 below the billhook 100, between a backward position and a forward position. The lower end portion 402 comprises a heel portion 410 connected to the arm portion 401, a front portion 411, and a side portion 412. The side portion 412 extends between the billhook 100 and the twine disc 201 and forms the connection between an end of the heel portion 410 with an opposite end of the front portion 411. The side portion 412 is provided with a knife blade 403 for cutting twines between the billhook and the twine receiver whilst moving from the backward position to the forward position. An open area 413 is formed between the heel portion 410 and the front portion 412. The open area 413 is dimensioned and shaped for being accessible by the twine delivering system (needle 11 and tucker arm, see further) so that twines can be delivered through said open area 413 on the billhook 100. In other words, the lower end portion 402 of the swing arm 400 is shaped in such a way that there is an opening at a side facing away from the twine disc 201, said opening being located underneath the billhook 100 in a knotter position of the swing arm 400. The front portion 411 is provided with a stripping part 404 having an upper surface with a shape that is complementary to a shape of a lower surface of the billhook 100, see also FIGS. 6A and 6B, so that a formed knot can be stripped from the billhook 100 whilst moving the swing arm from the backward position to the forward position. In other words the knife blade 403 will severe the twines 64a and 66a in response to a swinging movement of the arm 400 which also serves to bring the stripping part 404 in engagement with a knot formed on the billhook 100 for stripping such knot off of the billhook 100. Further, the front portion 411 has a curved guidance part 405 oriented in the direction of the heel part 410. The curved guidance part 405 is shaped, dimensioned and arranged for guiding the twines towards the side part 412 during stripping of a formed knot, and more in particular towards the inner angle formed by the front part 411 and the side part 412. The heel portion 411 has a curved guidance part 406 oriented in the direction of the front part 410. The curved guidance part 406 is arranged for guiding the twines across the billhook during delivery and during knotting. There may be provided an additional guide finger (not shown) to guide the twines before/during/after knotting, as in prior art solutions. Such a twine finger may be configured for guiding at least the needle twine, wherein the twine finger being mounted moveably below the billhook 100 and the swing arm 400. Drive means for the twine finger may then be configured to move the twine finger at least a first time during the first knot forming cycle and a second time during the second knot forming cycle. However, in view of the guidance parts 405 and 406, the additional guide finger is not required.

Driving power is transmitted to the discs of the twine disc 201 through a twine disc pinion 602, a worm gear drive 603 and a bevel gear 604 in position for sequential meshing engagement with a pair of circumferentially spaced gear sections 605, 606 on the knotter disc 501.

Power to swing the arm 400 about the pivot bolt 420 is obtained through a cam follower 430 at the upper end of the arm 400 beyond the pivot bolt 420, which is disposed within a cam track 440 on the knotter disc 501. A pair of circumferentially spaced cam shoulders 442 and 444 in the track 440 is positioned to sequentially engage the follower 430 to operate the latter. Cam follower 430 is connected with the swing arm 400. Cam track 440 may be provided in disc 501 or in a member mounted for rotating synchronously with disc 501, and is adapted for moving the swing arm 400 a first time and a second time during the first and the second knot forming cycle, respectively.

A shaft 30 extends parallel with the shaft 502 to a point substantially in fore-and-aft alignment with the billhook 100, see FIG. 2. At that location, the shaft 30 fixedly carries a rearward extending tucker arm 31. The tucker arm 31 carries a roller 33 at its rearmost end around which the strand 64a is entrained. A length of the strand 64a is also looped upwardly around a slacker arm 34 disposed above the tucker arm 31. The strand 64a may be further clamped between a pair of opposed plates (not shown) of a tensioning unit.

Figure 6C:
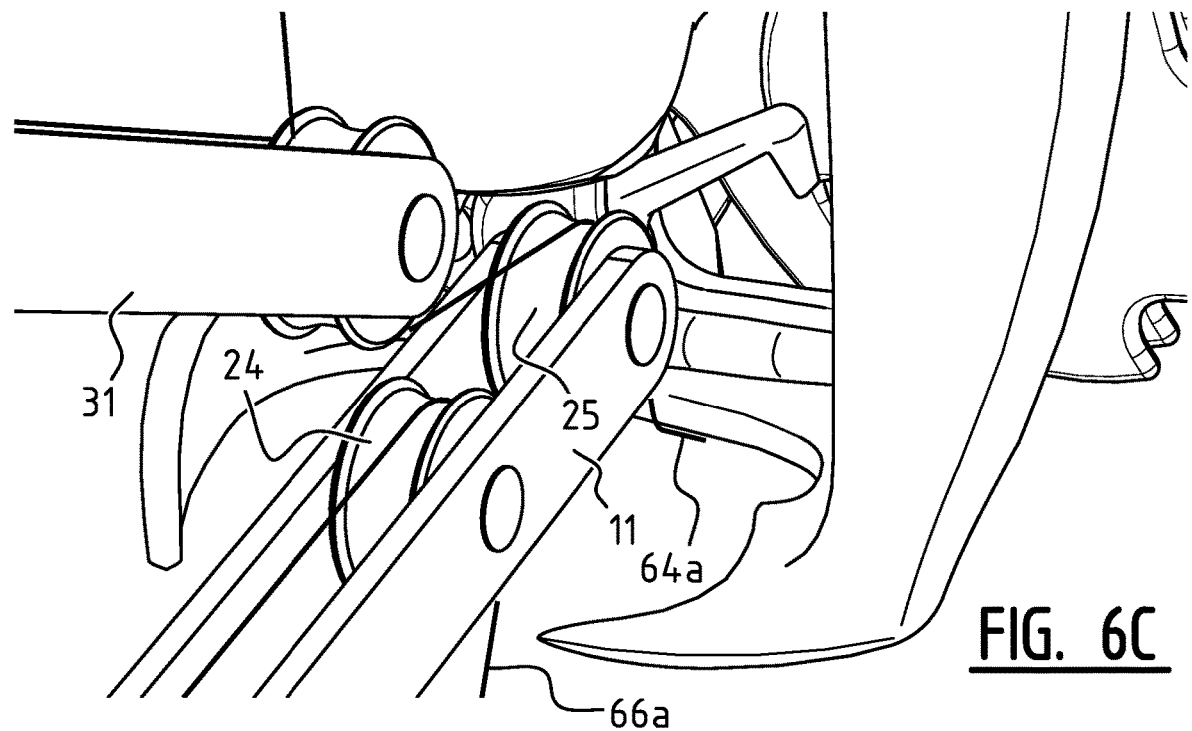

In FIG. 2, the needle 11 is still in its home position. At this point in the bale forming operation, the bale has reached its desired length and it is time to complete the loop around the bale and make the second knot in the loop. It is remarked that at this specific instance, the strand 64a stretches along the top of the bale directly beneath the swing arm 400 but, at least for all effective purposes, is out of contact with the knotter 10. The swing arm 400 moves backward, and the needle 11 swings upwardly toward the knotter 10. It carries with it the strand 66a as the latter is paid out by source 74. Note that because the strand 66a is threaded through the eyelet 21 of needle 11, a length of that strand on the twine source side of the needle 11 is also carried upwardly toward the knotter 10, such extra length being hereinafter denoted 66b. As the needle 11 approaches the knotter 10, the tucker arm 31 is also moved upward, see FIGS. 6A and 6B. The tucker arm 31 rocks upwardly in a counter-clockwise direction to provide the slack necessary in the strand 64a to accommodate the needle movement. The tip of the needle 11, and more particularly, the roller 25, snares the strand 64a as illustrated in FIG. 6C and presents twines 64a and 66a in unison to the knotter 10.

Figure 6D:
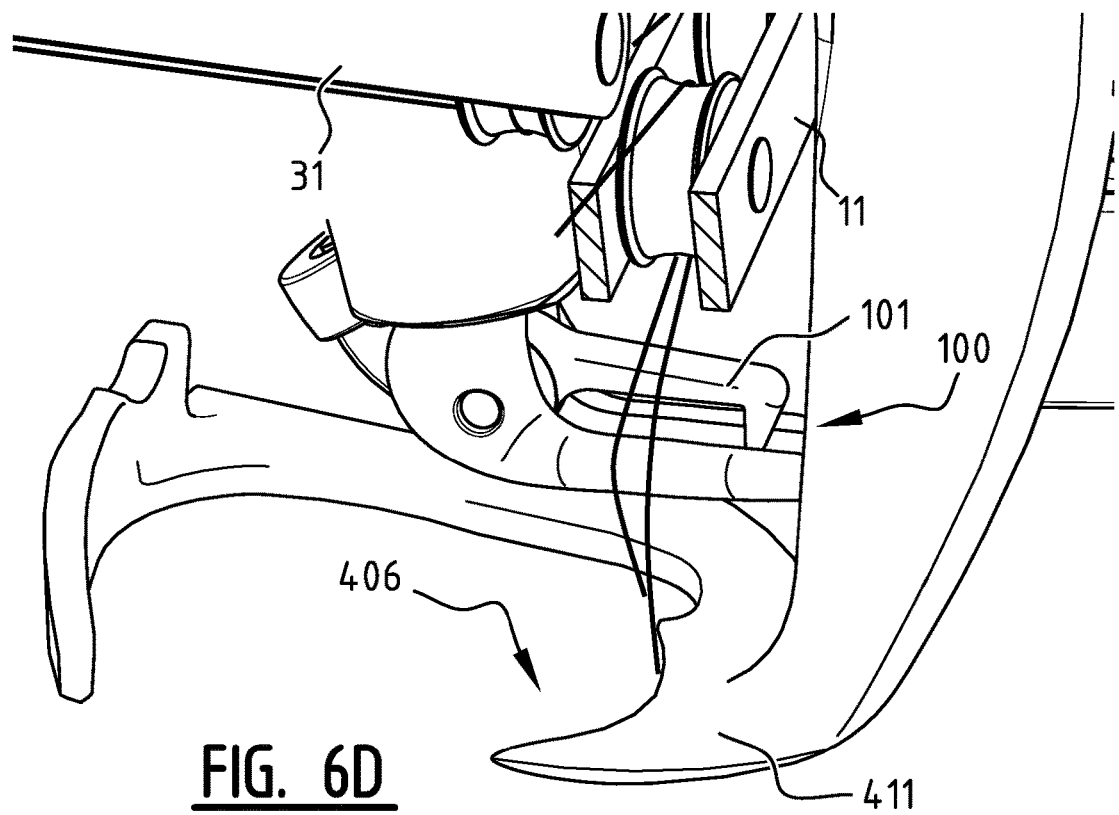
Figure 6E:
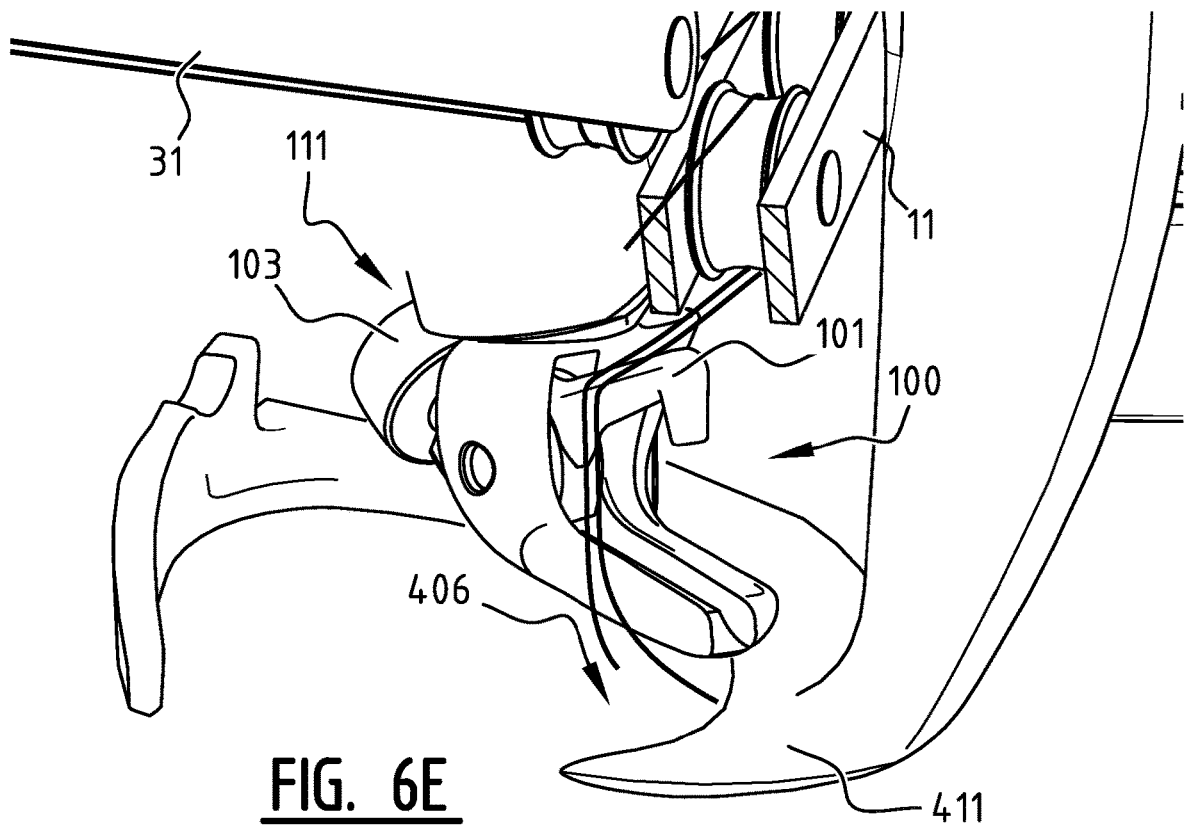
Figure 6F:
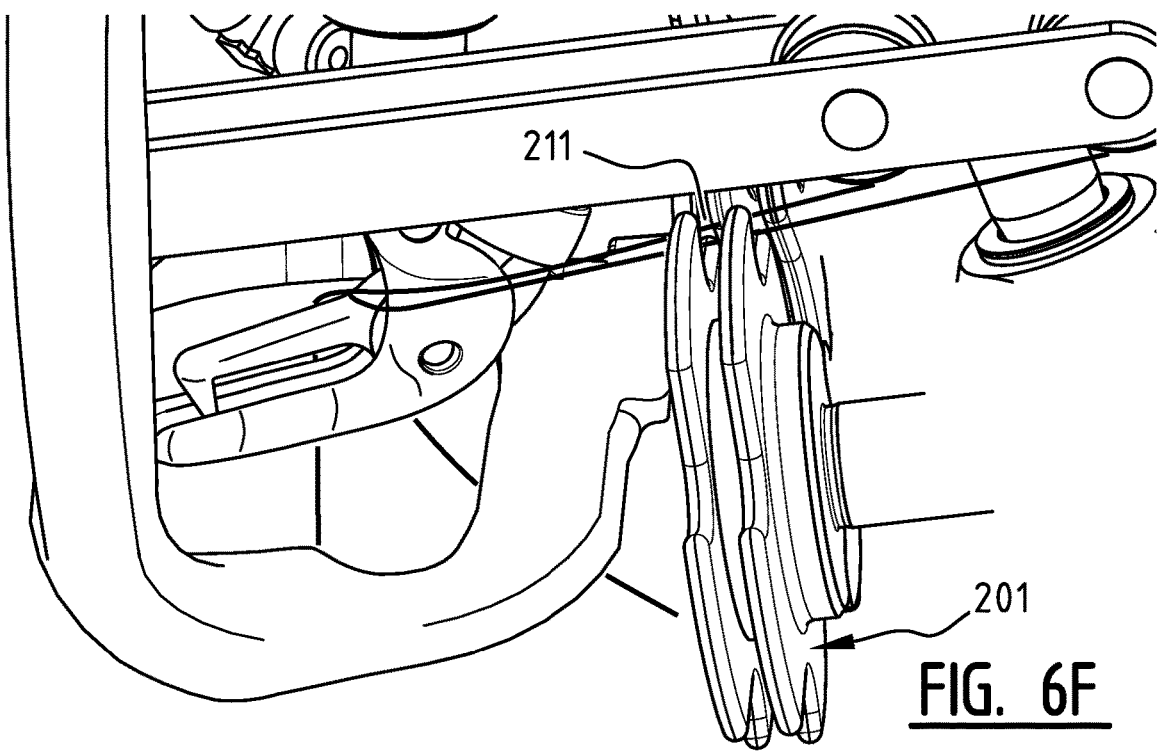
Figure 6G:
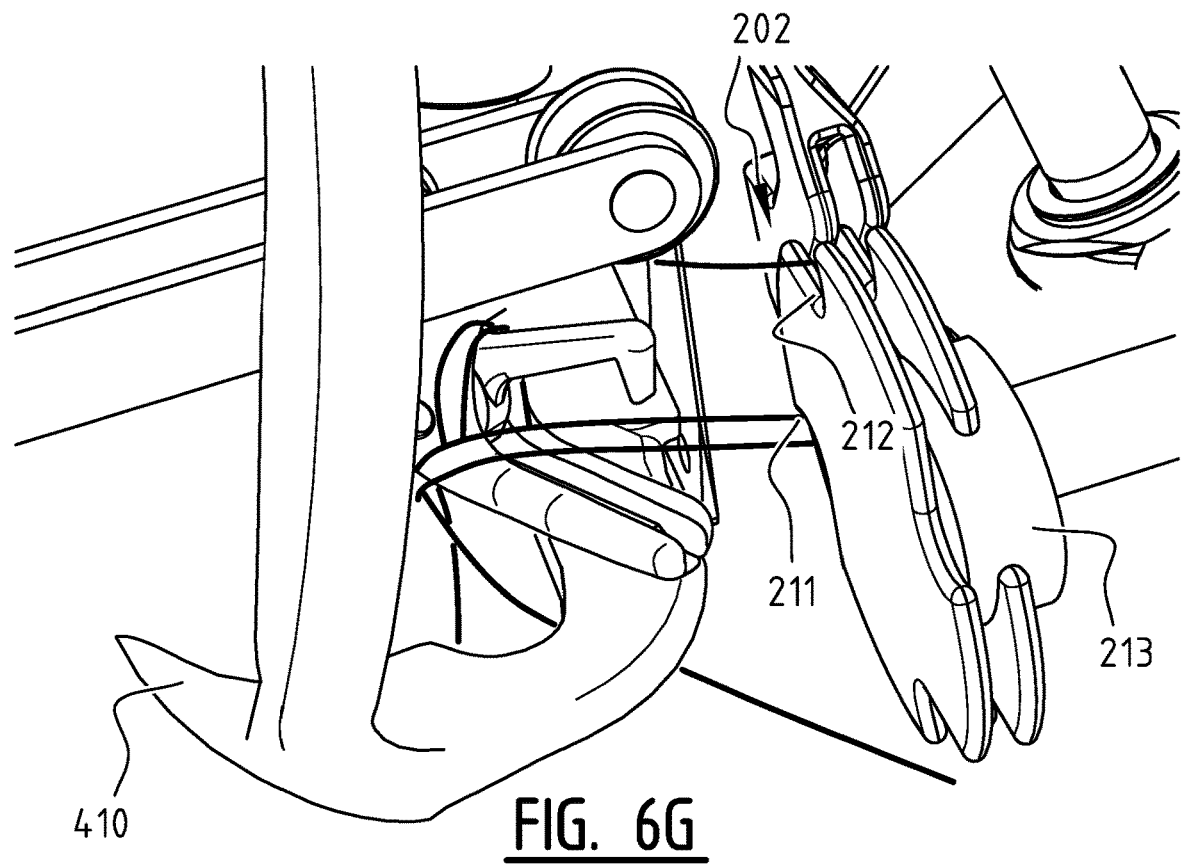

While the twines 64a and 66a are being delivered across the billhook 100 to the twine disc 201, the swing arm 400 is in a position to guide the twines so as to ensure that the twines 64a and 66a are both in proper position across the billhook 100, see FIG. 6D. Next, as shown in FIG. 6E, the billhook is opened to ensure that the twines 64a, 66a are properly positioned over the billhook 100, at an end portion of the upper lip 101 near the pivot point with the lower lip 102. Further the guide part 406 of the heel portion 411 may help in ensuring that the twines 64a, 66a are properly placed across an upper lip 101 of the billhook 100.

In presenting the twines 64a and 66a, the needle 11 drapes the twines across the billhook 100, optionally with the help of the guidance part 406, and thence into awaiting notches 211 of the twine disc 201, whereupon rotation of co-operating discs in the latter, in combination with a pressing twine holder 202, serve to firmly grip the twines 64a, 66a and prevent their escape as the billhook 100 begins its rotation, see FIGS. 6D, 6E, 6F and 6G. At that time the swing arm 400 moves a little backward (arrow B), moving the front portion 410 away from the billhook 100, to provide additional space for the rotation of the billhook.

Figure 6H:
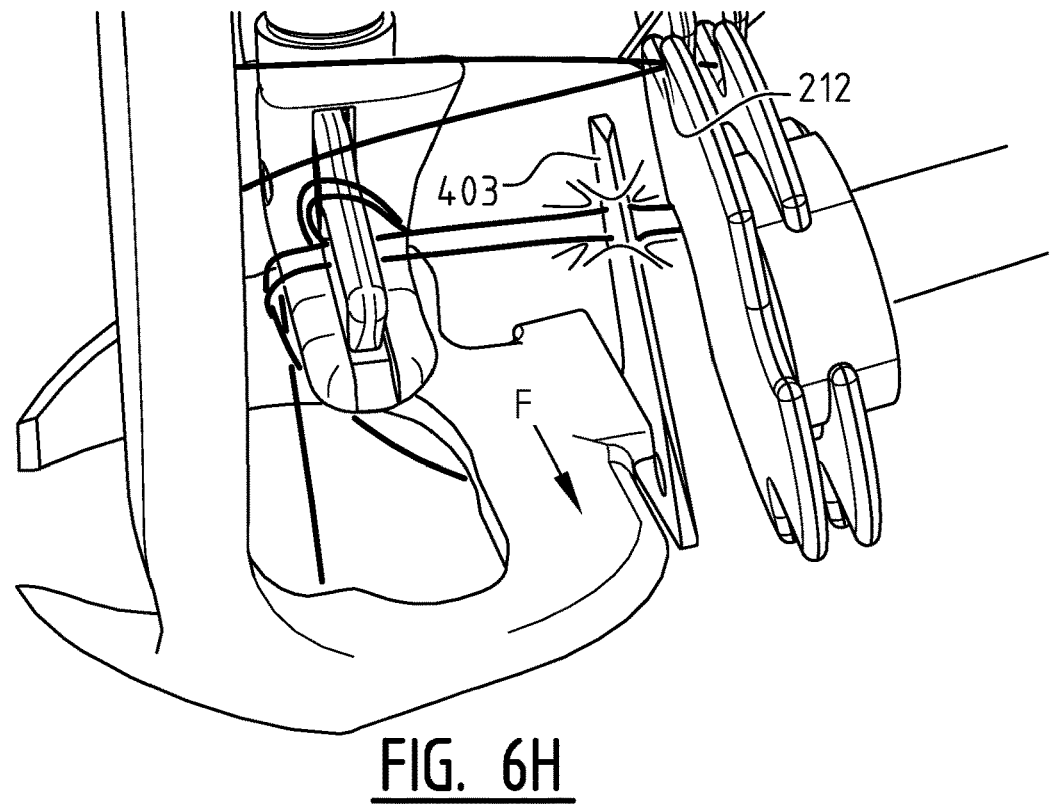

Typically, the twine disc 201 rotates a quarter of a turn and clamps the twines 64a and 66a firmly together in the first notch 211. Now the needle 11 can move downward. During the down travel of the needle 11 the two twines on the back of the needles are placed in the next notch 212 of the twine disc for the second knot, see FIGS. 6F and 6G. While the needle 11 goes down, the billhook 100 continues to rotate to form the first knot. During this further rotation of the billhook 100, the billhook 100 opens again, see FIG. 6G, such that the twines from first notch 211 can be positioned between the upper lip 101 and the lower lip 102. The swing arm 400 swings forward (arrow F in FIG. 6H) to cut the twines under the twine disc with the knife blade 403 and sweeps the knot from the billhook 100 with the help of the stripping part 404.

Figure 6I:
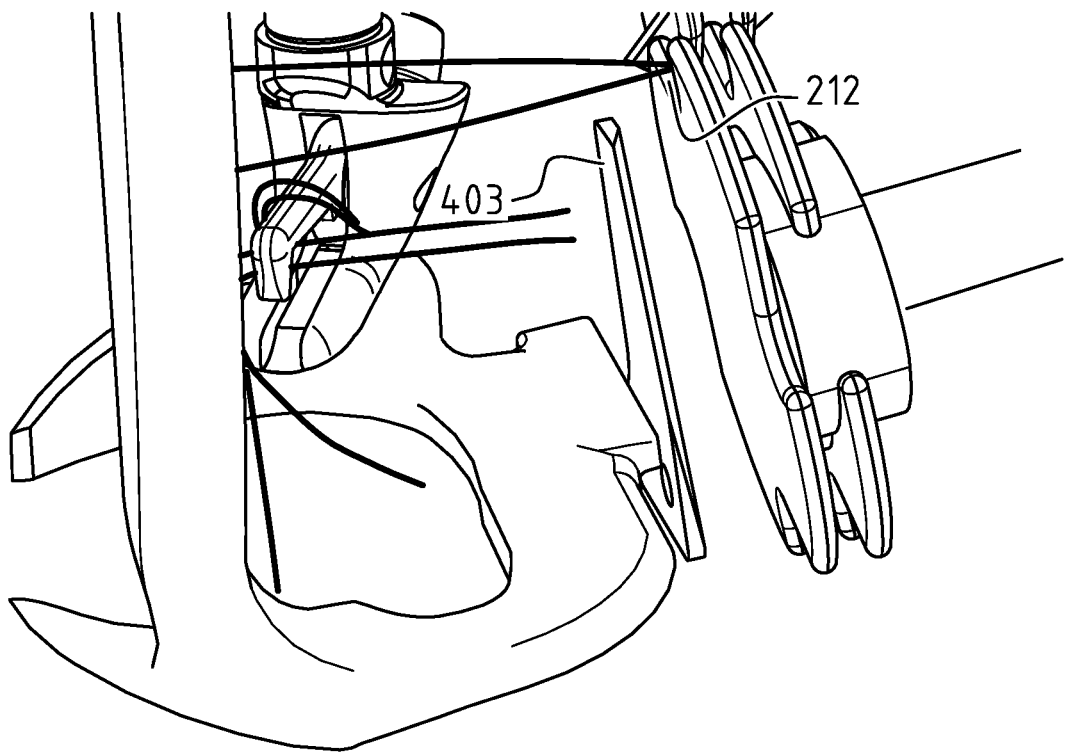
Figure 6J:
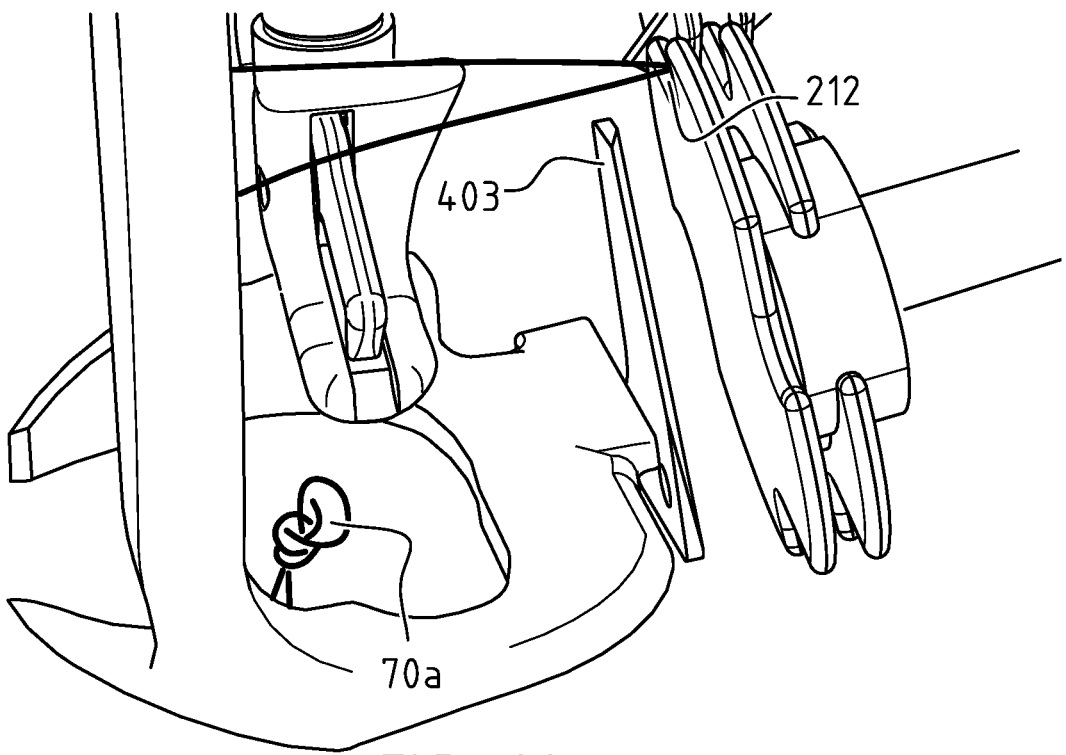

The foregoing described movement on the part of the billhook 100 and the twine disc 201 are brought about by operable inter-engagement of the gear stretch 504 and gear section 605 on the knotter disc 501 with their respective gears 503 and 604 on the billhook 100 and the twine disc 201. Such driving inter-engagement continues until a knot has been formed on the billhook 100, by which time the needle 11 has begun to withdraw. At this point, the cam shoulder 442 of the knotter disc 501 comes into engagement with the roller 430 of the arm 400 so as to swing the bottom of the latter, and hence the knife 403, across that portion of the twines between the billhook 100 and the twine disc 201, thereby severing the same. At the moment of cutting, the twines 64a and 66a extend from in between the lips 101 and 102 towards the twine disc 201, see FIG. 6H. To complete the knot formation, the stripping part 404 engages the twines 64a and 66a which are retained in a twisted manner around the billhook 100. In so doing, the strand parts lying on top of the upper lip 101 are pulled over the strand parts lying in between the upper and lower lips 101 and 102, thereby forming the first knot. Next, due to the presence of first recess 550 and first obstacle 560, the billhook 100 is briefly opened again after the first full rotation of the billhook 100, see FIGS. 6I and 6J. This will allow the first knot to be a loop knot 70a and will facilitate the releasing of the first knot from the billhook 100. Besides completing the knot, further motion of the arm 400 also helps to strip the finished knot completely from the billhook 100 and to drop the completed loop on the bale as illustrated in FIG. 6J.

Figure 9C:
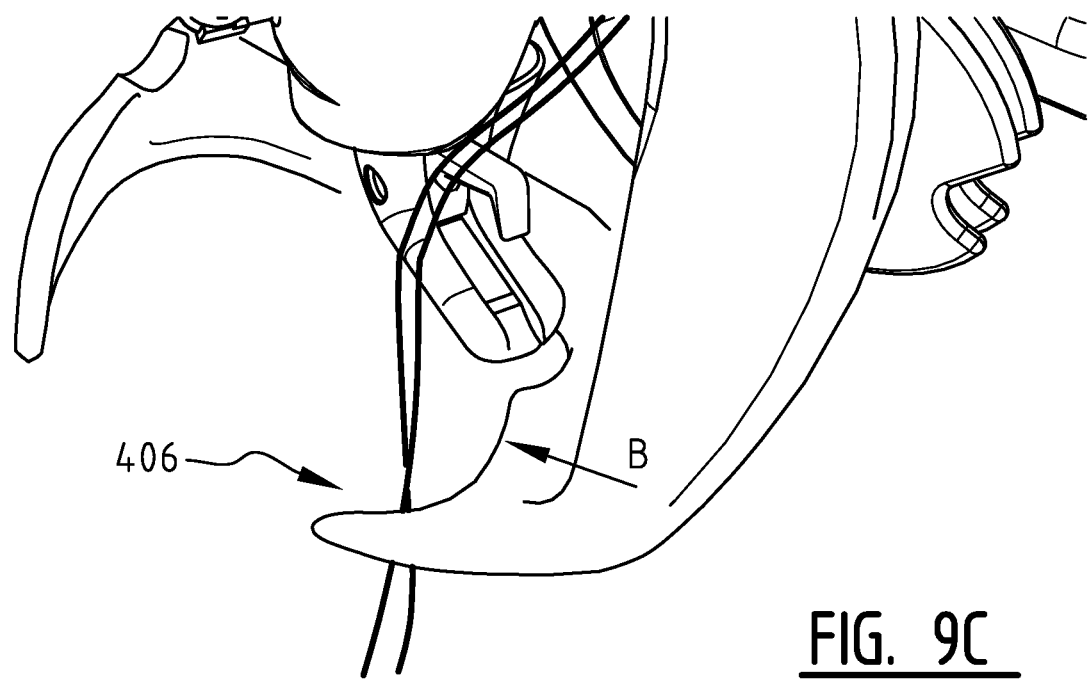
Figure 9D:
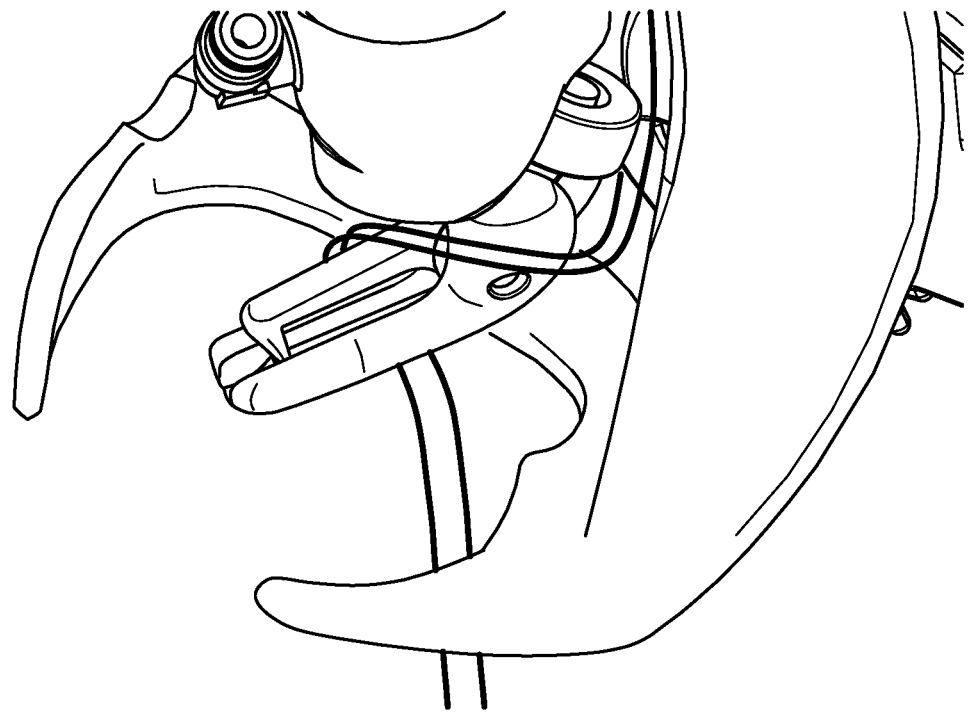
Figure 9E:
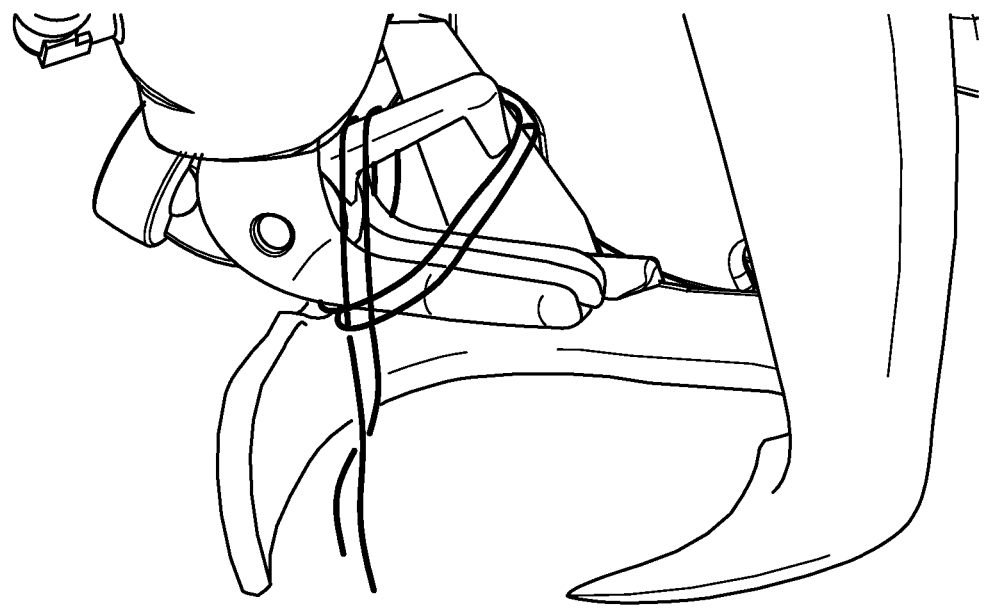

When the knot is dropped by the knotter 10, the strand 66b of needle twine from source 74, as well as strand 64b of tucker twine from source 72 is still retained in the second notch 212 and possibly also in the first notch 211 of the twine disc 201. Consequently, as the needle 11 continues to retract, the strand 66b is draped downwardly across the bale chamber 2 thereby pushing the upper lip 101 down because of the pressure of the twines on the upper lip 101, while the tucker arm 31 lowers to its normal position. Upon reaching the condition illustrated in FIG. 9B, the strands 64b and 66b are in position for initiating the second knot forming cycle. In a first angular range of the second rotation the billhook is briefly opened as illustrated in FIG. 9C, in order to ensure that the strands 64a and 66b are well positioned on the billhook 100, in a similar manner as described above for the first knot forming cycle. The swing arm 400, and in particular guidance part 406, may help with the proper positioning of the twines 64b and 66b across and in engagement with the billhook 100. Next the billhook 100 and the twine disc 201 are operated by their second respective gear stretch 505 and gear section 606 on the knotter disc 501, see FIGS. 9D, 9E and 9F, wherein the billhook 100 is opened a second time in a second angular range of the second rotation, whilst the cam follower 103 thereof passes over the second cam 112. Next, due to the presence of second recess 555 and second obstacle 565, the billhook 100 is briefly opened again after the second full rotation of the billhook 100, see FIGS. 9G and 9H. This allows the second knot to be a loop knot 70a and facilitates the releasing of the second knot from the billhook 100.

Figure 9F:
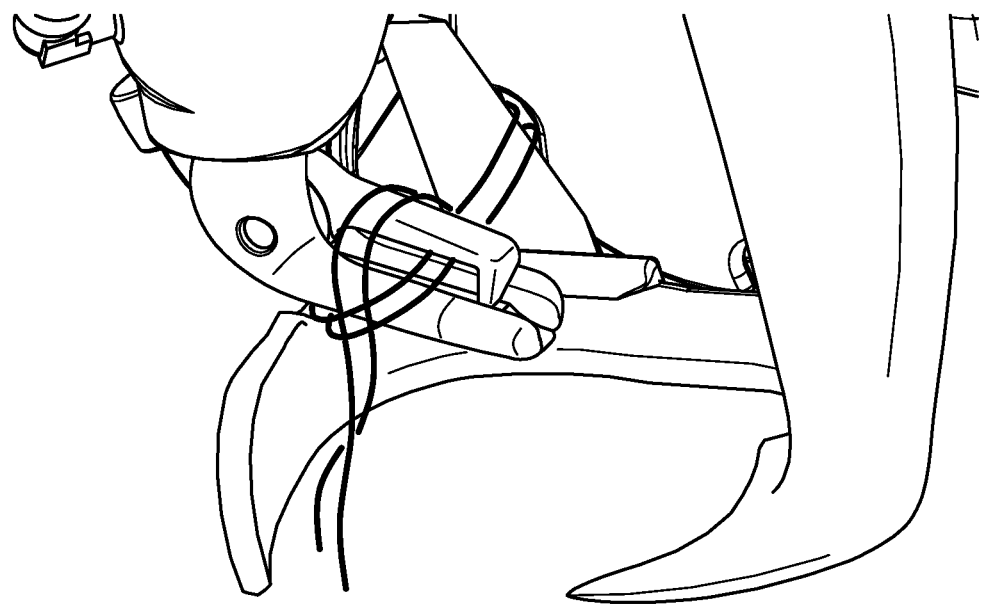
Figure 9G:
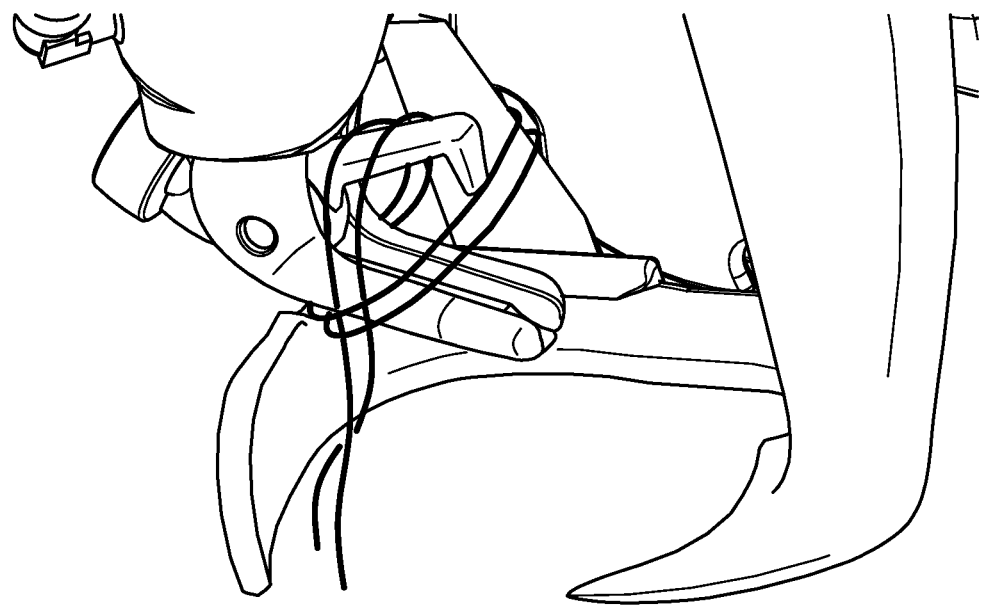
Figure 9H:
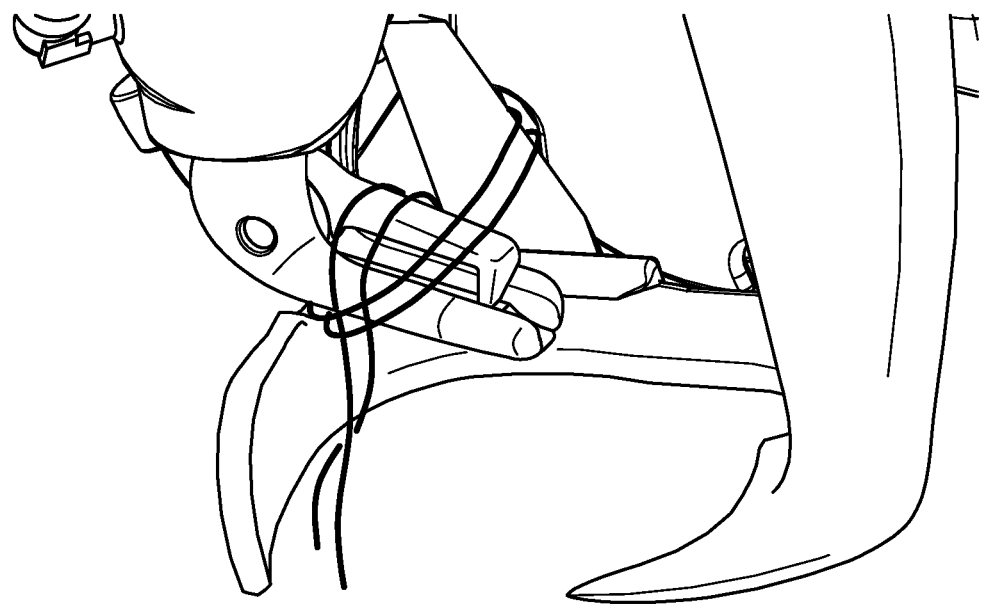
Figure 91:
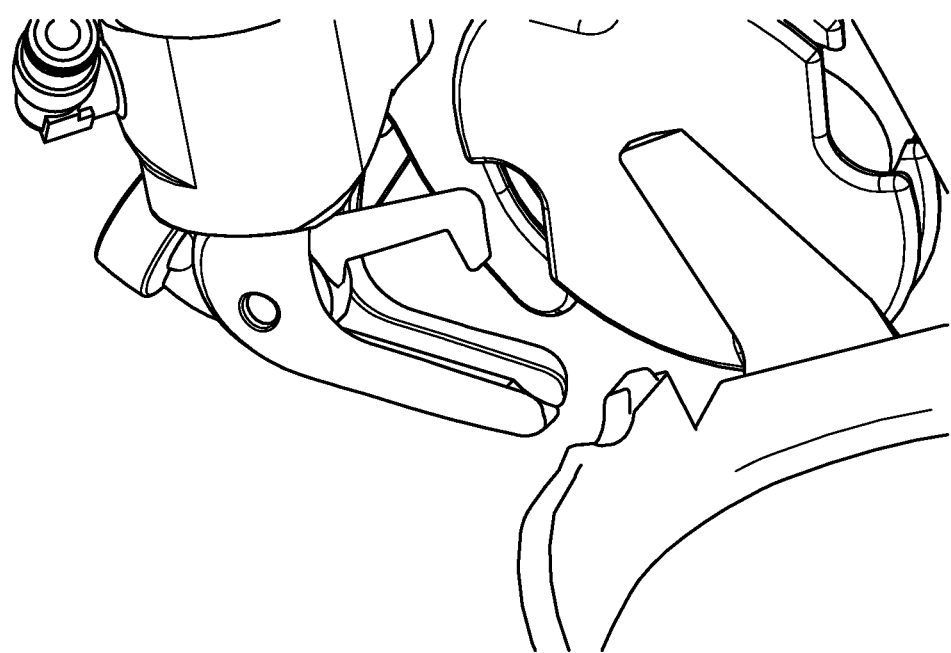

Thus, the second knot becomes formed, whereupon the arm 400 is once again actuated, but this time by the second cam shoulder 444. Preferably the twine disc 201 has a protruding ridge 213 positioned after the second notch 212, seen in a rotation direction of the disc 201, so that the twine holder 202 is moved away from the twine disc 201 when the disc is further rotated during the forming of the second knot. Because the free ends of the strands 64b and 66b are considerably longer than the free ends obtained during the first knot formation, upon finalizing the knot, the free ends of the strands 64b and 66b no longer are pulled completely out of the knot, resulting in a so-called loop-knot 68b, as best seen in FIGS. 9F-9H and in FIG. 2. FIG. 9I illustrates the swing arm 400 with the lower end portion in the forward position, after removal of the knot. In this position the cam follower 103 of billhook 100 is on the first cam 111, with the billhook 100 open.

Figure 7A:
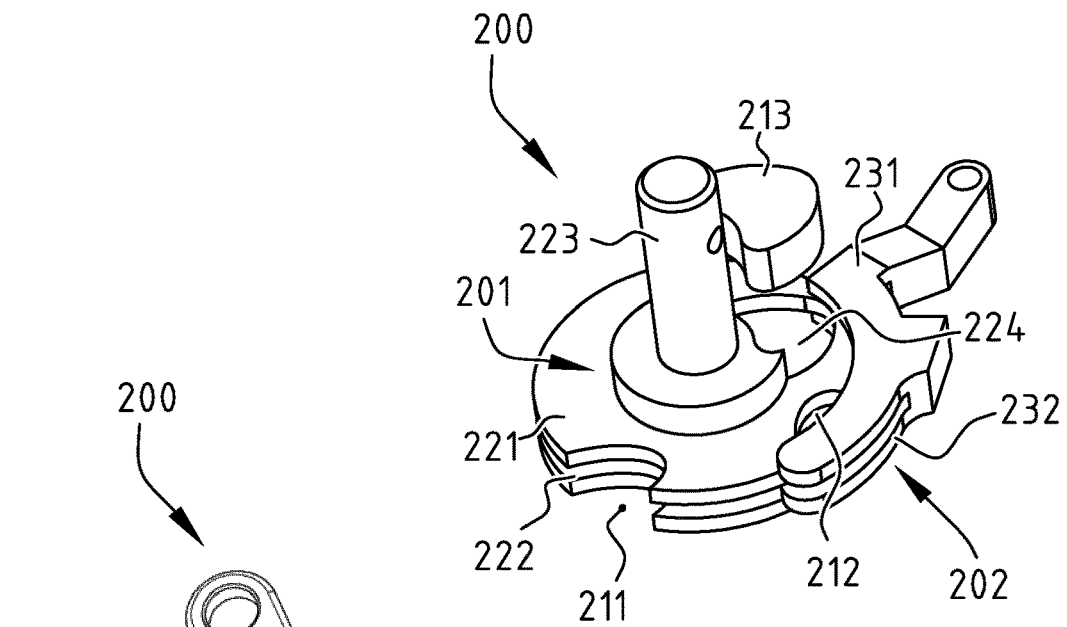
FIG. 7A is a perspective view of a first exemplary embodiment of a twine receiver.
Figure 7B:
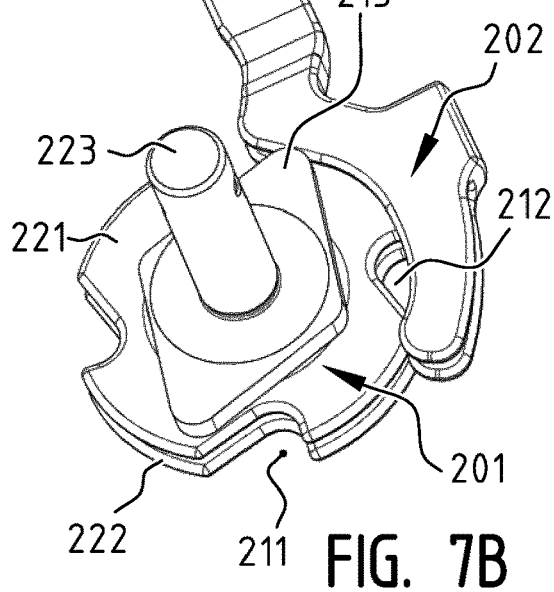
FIG. 7B is a perspective view of a second exemplary embodiment of a twine receiver.

FIG. 7A illustrates a first example of a possible twine receiver 200 comprising a twine disc 201 and a twine holder 202. The twine disc 201 comprises a first disc 221 and a second disc 222 fixed on an axis 223. The twine holder comprises a first press plate 231 and a second press plate 232 intended for being inserted between the first and second disc 221, 222. The first press plate is intended for being in operative contact with the outer side of the first disc 221. The first disc 221 is provided at its inner and/or outer side with a protruding ridge 213. In the embodiment of FIG. 7A the ridge extends at both sides of the first disc 221, while in the embodiment of FIG. 7B the ridge extends only at the outer side of disc 221. In the variant of FIG. 7A, the first disc 221 is provided with an opening 224, and the ridge 213 is formed by a piece 213 that is fixed through the opening 224 on the second disc 222. The skilled person will understand that other shapes are possible and that it may be possible to provide more or less notches in the twine disc. However, providing the twine disc with only two notches 211, 212 spaced along the circumference at an angle which approximately 90 degrees, as in the embodiment of FIG. 7A, is advantageous because this will allow the notches to be located at a lower part of the twine discs 201 when the knotter is in a non-active state. This will avoid that dirt can accumulate in the notches in the non-operative state of the knotter.

According to an alternative variant the pressure exerted by the leaf spring 220 could be regulated using a setting means adapted to decrease this pressure at the end of the second rotation of the billhook 100. According to yet another possibility the twine holder 202 could be pushed away against the force of the leaf spring 220 during the formation of the second knot. The skilled person understands that this regulating of the pressure/pushing away of the twine holder can be reached using any suitable mechanical or hydraulic transfer. Also, instead of providing the spring means 220, there could be provided a different actuator for biasing the twine holder 202. Finally the skilled person understands that an adaption of shape of the notches 211, 212 and the use of a protruding ridge 213 may be combined.

As illustrated in FIG. 3A-3D, there may be provided a supplementary gear section 606' providing a prolonged operation of the twine disc 201, so that the twine disc rotates over approximately 270 degrees during the second knot forming cycle. This prolonged rotation in combination with the protruding ridge 213 will result in the twines 64b and 66b being no longer retained between the twine disc 201 and the twine holder 202, causing a further slipping of the twines during the forming of the second knot. Indeed, even though the knife blade 403 is very sharp, it will not be able to cut the twines because instead of holding the twines, the twine disc 201 is releasing them on account of the continued rotation of the twine disc 201 and the low pressure of the twine holder 202 on the twines, while the arm 400 continues moving and stripping of the almost completed knot from the billhook 100, thus pulling the twines out of the twine disc 201. The skilled person understands that the supplementary gear section 606 is not necessary, and that a similar effect can be reached when the tensioning force of the leaf spring 220 to the twine holder 202 is sufficiently decreased.

This second knot is the start of a new bight for the next bale. Such bight is in position to receive new material that is packed into the bale chamber by the plunger, and the bight grows in length as additional lengths of the twines 64b and 66b are simultaneously pulled from their sources 72 and 74. Finally, when the bale has reached its desired size, the sequence returns to its starting point, whereupon the bight is closed by operation of the needle 11 to complete the loop around the bale and form the other knot.

Figure 8:
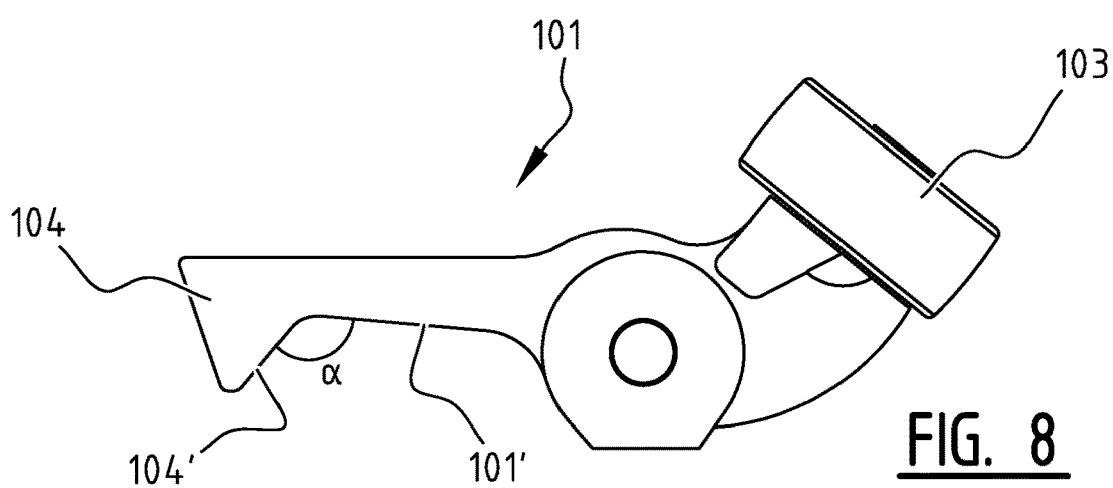
FIG. 8 is a schematic view of a modified upper lip of a billhook according to an exemplary embodiment.

In yet another embodiment the cam surface may have only the second cam 112 as in prior art solutions and the billhook 100 itself may be modified to cause the opening of the billhook in the first angular range as defined above. For example, as illustrated in FIG. 8 the upper lip 101 of billhook may be made heavier at the lower side of downwardly protruding end part 104. This additional material can be chosen such that the upper lip 101 opens in the first angular range. More in particular the upper lip 101 may be provided with a hook-like end part 104 protruding in the direction of the lower lip. The hook-like end part 104 has an inner face 104' making an obtuse angle α with a lower face 101' of an elongate portion of the upper lip 101. By increasing the angle α the billhook can be more easily opened by a strand. When such an embodiment is used an appropriate compromise has to be found between the shape of the upper lip 101, and in particular of the hook-like end part 104, and the tension in strands.

While the principles of the invention have been set out above in connection with specific embodiments, it is to be understood that this description is merely made by way of example and not as a limitation of the scope of protection, which is determined by the appended claims.

The invention claimed is:

1. A knotter system for performing a knotter cycle of a baler, the knotter cycle having at least a first knot forming cycle and a second knot forming cycle, the knotter system comprising:
   a needle configured for delivering a needle twine;
   a tucker arm configured for delivering a tucker twine;
   a billhook assembly comprising a billhook with a lower lip and an upper lip mounted pivotally with respect to lower lip, the billhook being mounted rotatably around a rotational axis and being arranged for receiving the needle twine and the tucker twine; and
   a driver adapted to make the billhook perform at least a first full rotation around its rotational axis during the first knot forming cycle and a second full rotation around its rotational axis during the second knot forming cycle,
   wherein the driver comprises a pinion and at least a first gear stretch and a second gear stretch provided along a circumference of a disc, the pinion being adapted to cooperate with the first and second gear stretches for making the billhook perform the first and second full rotations respectively when the disc is rotated for forming the first knot and the second knot, respectively,
   wherein the disc comprises a recess downstream of at least one of the first gear stretch and the second gear stretch,
   wherein an obstacle is arranged for engaging the pinion when moving in the recess, and
   wherein the recess and the obstacle are configured to rotate the pinion over a determined angle and back in order to move the upper lip of the billhook away from the lower lip and back after at least one of the first full rotation and the second full rotation.

2. The knotter system of claim 1, wherein the obstacle is a spring mounted element fixed to the disc.

3. The knotter system of claim 1, wherein the recess extends along the circumference of the disc over an angular distance of 10 to 90 degrees.

4. The knotter system of claim 1, wherein the obstacle is any one of the following: a spring-mounted arm, a spring mounted wheel.

5. The knotter system of claim 1, wherein at least one of the first gear stretch and the second gear stretch has an outer gear stretch arranged on an outwardly protruding portion of the disc, and an inner gear stretch delimited by a downstream bottom land portion and an upstream bottom land portion; and
   wherein the pinion comprises an outer teeth range configured to cooperate with the outer gear stretch, and an inner teeth range configured to cooperate with the inner gear stretch, the inner teeth range being delimited by a contact portion configured to rotate in the downstream and upstream bottom land portions and to slide over the disc when the pinion is not engaged with the first gear stretch or the second gear stretch.

6. The knotter system of claim 5, wherein the recess is configured to receive the contact portion and to cause the contact portion to rotate over the determined angle and back, wherein the contact portion has a curved contact surface.

7. The knotter system of claim 5, wherein the recess, the inner gear stretch and the downstream and upstream bottom land portions are positioned on the same circular path around an axis of the disc.

8. The knotter system of claim 5, wherein an angular distance between the recess and the downstream bottom land portion is smaller than 30 degrees.

9. The knotter system of claim 5, wherein the obstacle is configured to engage the outer teeth range of the pinion.

10. The knotter system of claim 5, wherein the recess, seen in a downstream direction, slopes first gradually downwardly and next gradually upwardly.

11. The knotter system of claim 1, wherein the billhook assembly is configured to position the upper lip away from the lower lip in a first angular range and to position the upper lip away from the lower lip in a second angular range of at least one of the first full rotation and the second full rotation, wherein the first angular range is located within a range between 0° and 160°, and the second angular range is located within a range between 160° and 360°.

12. The knotter system of claim 11, wherein the billhook assembly is configured to move the upper lip away from the lower lip and back a first time in the first angular range and to move the upper lip away from the lower lip a second time in the second angular range.

13. The knotter system of claim 11, wherein the billhook assembly comprises a cam surface, and wherein the billhook is provided with a cam follower in contact with the cam surface-, the cam surface being configured for moving the upper lip away from the lower lip.

14. The knotter system of claim 13, wherein the cam surface is provided with a first and a second cam configured for pushing the upper lip away from the lower lip, in the first angular range and in the second angular range, respectively, during the first full rotation and during the second full rotation.

15. The knotter system of claim 1, further comprising:
   a twine receiver configured for holding the needle twine and the tucker twine; and
   a swing arm adapted for cutting twines between the billhook and the twine receiver,
   the driver is further configured to move the swing arm a first time from a rest position to an extended position and back during the first knot forming cycle and a second time during the second knot forming cycle.

16. The knotter system of claim 15, wherein the swing arm is configured for sweeping a formed knot from the billhook during the first knot forming cycle and during the second knot forming cycle, respectively.

17. The knotter system claim 15, wherein the twine receiver is adapted to let the twines slip during the second knot forming cycle so that cutting of the needle and the tucker twine is avoided when forming the second knot.

18. The knotter system of claim 15, wherein the driver comprises a cam track and a cam follower, the cam follower being connected with the swing arm, and the cam track being provided in the disc or in a member mounted for rotating synchronously with the disc, and being adapted for moving the swing arm a first time and a second time during the first knot forming cycle and the second knot forming cycle, respectively.

19. A baler comprising a plurality of knotter systems, each of the plurality of knotter systems for performing a knotter cycle of the baler, the knotter cycle having at least a first knot forming cycle and a second knot forming cycle, each of the plurality of knotter systems comprising:
   a needle configured for delivering a needle twine;

a tucker arm configured for delivering a tucker twine;

a billhook assembly comprising a billhook with a lower lip and an upper lip mounted pivotally with respect to lower lip, the billhook being mounted rotatably around a rotational axis and being arranged for receiving the needle twine and the tucker twine; and a driver adapted to make the billhook perform at least a first full rotation around its rotational axis during the first knot forming cycle and a second full rotation around its rotational axis during the second knot forming cycle, wherein the driver comprises a pinion and at least a first gear stretch and a second gear stretch provided along a circumference of a disc, the pinion being adapted to cooperate with the first and second gear stretches for making the billhook perform the first and second full rotations respectively when the disc is rotated for forming the first knot and the second knot, respectively, wherein the disc comprises a recess downstream of at least one of the first gear stretch and the second gear stretch, wherein an obstacle is arranged for engaging the pinion when moving in the recess, and wherein the recess and the obstacle are configured to rotate the pinion over a determined angle and back in order to move the upper lip of the billhook away from the lower lip and back after at least one of the first full rotation and the second full rotation.

\* \* \* \* \*